United States Patent
Bridges

(10) Patent No.: US 9,531,967 B2
(45) Date of Patent: Dec. 27, 2016

(54) DYNAMIC RANGE OF A LINE SCANNER HAVING A PHOTOSENSITIVE ARRAY THAT PROVIDES VARIABLE EXPOSURE

(71) Applicant: FARO Technologies, Inc., Lake Mary, FL (US)

(72) Inventor: Robert E. Bridges, Kennett Square, PA (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 14/583,920

(22) Filed: Dec. 29, 2014

(65) Prior Publication Data

US 2015/0189201 A1    Jul. 2, 2015

Related U.S. Application Data

(60) Provisional application No. 61/922,168, filed on Dec. 31, 2013.

(51) Int. Cl.
  *G06K 9/00* (2006.01)
  *H04N 5/355* (2011.01)
  (Continued)

(52) U.S. Cl.
  CPC ......... *H04N 5/35554* (2013.01); *G01B 11/005* (2013.01); *G01B 11/25* (2013.01); *H04N 5/3532* (2013.01)

(58) Field of Classification Search
  CPC .............. H04N 5/2256; H04N 13/0253; H04N 13/0296; H04N 5/23238
  (Continued)

(56) References Cited

U.S. PATENT DOCUMENTS 3,971,065 A    7/1976    Bayer
4,846,577 A    7/1989    Grindon
(Continued)

FOREIGN PATENT DOCUMENTS

DE    102009055988 B3    3/2011
DE    102010045803 A1    3/2012
(Continued)

OTHER PUBLICATIONS

German Office Action for Application No. 10 2013 110 583.1 dated Nov. 27, 2015; pgs 2.
(Continued)

*Primary Examiner* — Yosef Kassa
(74) *Attorney, Agent, or Firm* — Cantor Colburn LLP

(57) ABSTRACT

A line scanner measures 3D coordinates of an object surface and includes a projector with a light source that projects a line of light at the object surface. The line scanner also has a camera with a 2D array of light sensors and electronics that controls the exposure and readout times of each light sensor, the exposure time being controlled in either rows or columns of the array in a non-sequential manner, the readout time being controlled in either rows or columns that are the same as the rows or columns whose exposure time is being controlled, each of the light sensors converts an amount of captured optical energy into a digital signal value, the captured optical energy being from a reflected line of light from the object surface. Further includes a processor that receives the digital signal values and calculates the 3D coordinates of the object surface.

5 Claims, 21 Drawing Sheets

(51) Int. Cl.
*G01B 11/00* (2006.01)
*G01B 11/25* (2006.01)
*H04N 5/353* (2011.01)

(58) Field of Classification Search
USPC ........ 382/154, 282, 284, 286, 291; 345/419, 345/653, 664
See application file for complete search history.

(56) References Cited

U.S. PATENT DOCUMENTS

| | | | |
|---|---|---|---|
| 5,280,542 A | 1/1994 | Ozeki et al. | |
| 5,402,582 A | 4/1995 | Raab | |
| 5,611,147 A | 3/1997 | Raab | |
| 5,812,269 A | 9/1998 | Svetkoff et al. | |
| 5,828,793 A | 10/1998 | Mann | |
| 5,986,745 A | 11/1999 | Hermary et al. | |
| 6,590,640 B1 * | 7/2003 | Aiken | G01C 15/002 356/3.01 |
| 6,628,335 B1 * | 9/2003 | Numazaki | G06F 3/0304 348/370 |
| 6,721,007 B1 * | 4/2004 | Tani | G01S 7/4816 348/296 |
| 6,753,876 B2 | 6/2004 | Brooksby et al. | |
| 6,822,681 B1 * | 11/2004 | Aoki | H04N 13/0253 348/295 |
| 6,822,687 B1 * | 11/2004 | Kakiuchi | G01C 3/08 348/207.99 |
| 6,876,392 B1 * | 4/2005 | Uomori | G01S 7/481 348/347 |
| 7,006,142 B2 * | 2/2006 | Seo | G01S 7/483 257/E27.157 |
| 7,084,989 B2 * | 8/2006 | Johannesson | G01B 11/046 356/601 |
| 7,202,957 B2 * | 4/2007 | Ban | G01B 11/25 356/603 |
| 7,203,573 B2 * | 4/2007 | Ban | B25J 9/1697 318/568.1 |
| 7,212,665 B2 * | 5/2007 | Yang | G06K 9/00362 382/159 |
| 7,230,708 B2 * | 6/2007 | Lapotko | G01N 21/171 356/432 |
| 7,237,919 B2 * | 7/2007 | Uomori | G01S 7/4815 356/3.1 |
| 7,386,367 B2 * | 6/2008 | Watanabe | B25J 9/1697 700/245 |
| 7,489,410 B2 * | 2/2009 | Nishio | G01B 11/026 356/614 |
| 7,496,619 B2 * | 2/2009 | Aldroubi | G06T 5/001 708/446 |
| 7,570,185 B2 * | 8/2009 | Rao | H03M 1/1028 341/118 |
| 7,620,235 B2 * | 11/2009 | Daniel | G01B 11/2518 345/426 |
| 7,680,314 B2 * | 3/2010 | Hong | G06T 7/0087 382/131 |
| 7,787,678 B2 * | 8/2010 | Unal | G06T 7/0012 382/128 |
| 8,773,700 B2 | 7/2014 | Inoue et al. | |
| 9,008,369 B2 | 4/2015 | Schofield et al. | |
| 2003/0090646 A1 | 5/2003 | Riegl et al. | |
| 2003/0117412 A1 | 6/2003 | Brooksby et al. | |
| 2005/0278098 A1 | 12/2005 | Breed | |
| 2007/0064976 A1 | 3/2007 | England, III | |
| 2007/0296979 A1 | 12/2007 | Morimoto et al. | |
| 2008/1057310 | 5/2008 | Toshifumi et al. | |
| 2009/0187373 A1 | 7/2009 | Atwell et al. | |
| 2010/0128109 A1 | 5/2010 | Banks | |
| 2010/0329554 A1 | 12/2010 | Zhai et al. | |
| 2011/0046917 A1 | 2/2011 | Lippuner et al. | |
| 2011/0143811 A1 | 6/2011 | Rodriguez | |
| 2011/0170534 A1 | 7/2011 | York | |
| 2011/0292406 A1 | 12/2011 | Hollenbeck | |
| 2012/0287265 A1 | 11/2012 | Schumann et al. | |
| 2013/0107032 A1 | 5/2013 | Yamada | |
| 2013/0176453 A1 | 7/2013 | Mate et al. | |
| 2013/0286196 A1 | 10/2013 | Atwell | |
| 2013/0342674 A1 | 12/2013 | Dixon | |
| 2014/0002608 A1 | 1/2014 | Atwell et al. | |
| 2015/0085079 A1 | 3/2015 | Gittinger et al. | |

FOREIGN PATENT DOCUMENTS

| | | |
|---|---|---|
| DE | 102011103510 A1 | 12/2012 |
| DE | 102012105027 A1 | 1/2013 |
| JP | H05294057 A | 11/1993 |
| JP | H05340727 A | 12/1993 |
| JP | H06265320 A | 9/1994 |
| JP | 2004037274 A | 2/2004 |
| JP | 2009085775 A | 4/2009 |
| JP | 2009168658 A | 7/2009 |
| JP | 2010085472 A | 4/2010 |
| JP | 2013064644 A | 4/2013 |
| JP | 2013516928 A | 5/2013 |
| JP | 2013113696 A | 6/2013 |
| WO | 2010000230 A2 | 1/2010 |
| WO | 2011053678 A1 | 5/2011 |
| WO | 2011085283 A1 | 7/2011 |
| WO | 2013101620 A1 | 7/2013 |

OTHER PUBLICATIONS

Abolbashari, et al., "High dynamic range compressive imaging; a programmable imaging system", Optical Engineering, Jun. 11, 2012, Retrieved from the Internet: URL: http://dx.doi.org/10.1117/1.0E.51.7.071407; 9 pages.

Gu, Jinwei et al., "Coded Rolling Shutter Photography: Flexible Space-Time Sampling," Computational Photography (ICCP), 2010, IEEE International Conference on, IEEE, Piscataway, NJ, USA, Mar. 29, 2010, 8 pgs.

Notification of Transmittal of the International Search Report and the Written Opinion of the International Searching Authority, or the Declaration, PCT/US2014/072638; Mar. 18, 2015, 12 pages.

Notification of Transmittal of the International Search Report and the Written Opinion of the International Searching Authority, or the Declaration; PCT/US2014/046586; Mailed Oct. 16, 2014, 10 pages.

Notification of Transmittal of the International Search Report and the Written Opinion of the International Searching Authority, or the Declaration; PCT/US2014/050793, Dec. 9, 2014, 11 pages.

Notification of Transmittal of the International Search Report and the Written Opinion of the International Searching Authority, or the Declaration; PCT/US2014/072315, Mar. 6, 2015, 10 pages.

Non Final Office Action for U.S. Appl. No. 14/494,639, filed Jun. 29, 2016; 24 pages.

\* cited by examiner

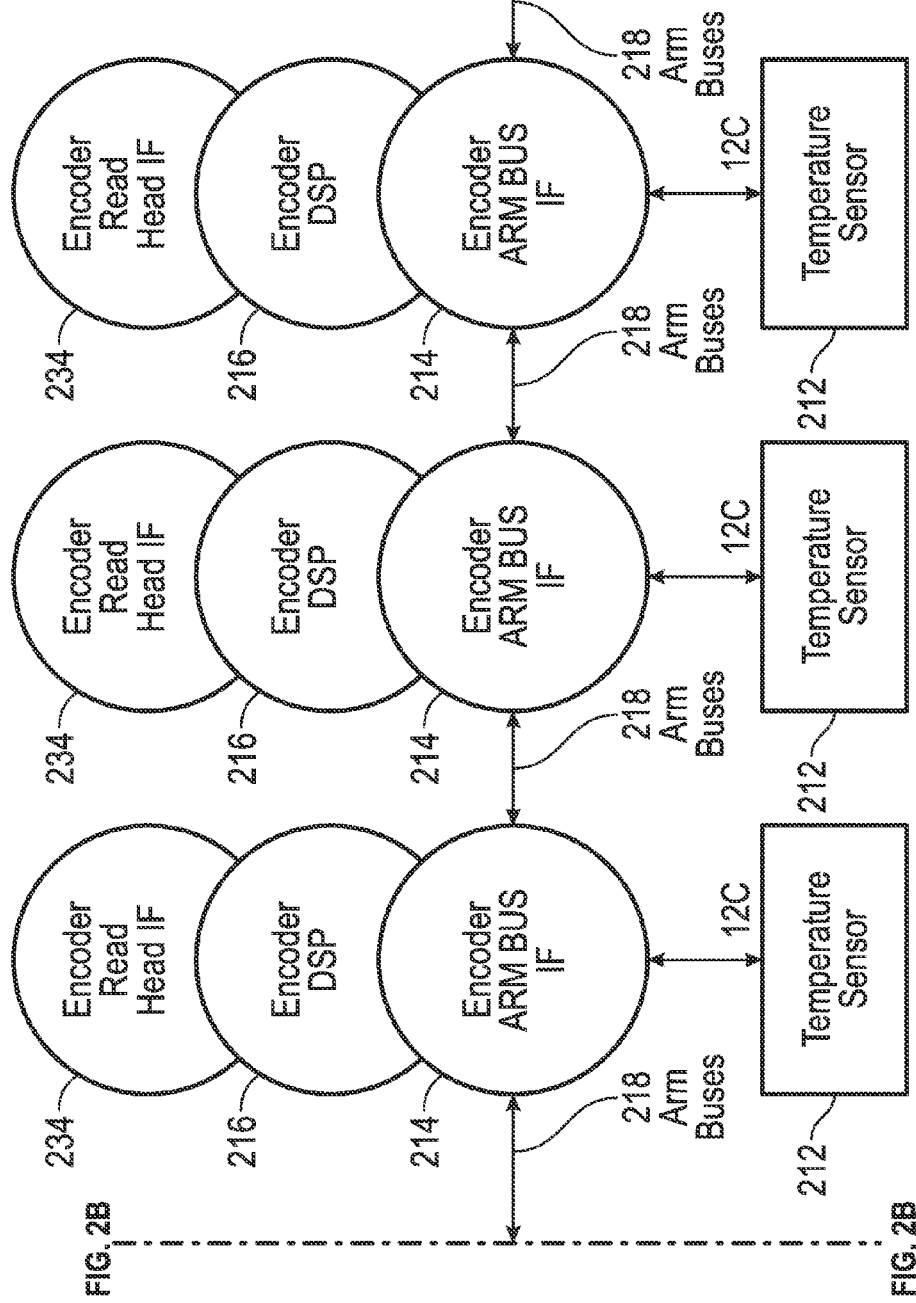

DYNAMIC RANGE OF A LINE SCANNER HAVING A PHOTOSENSITIVE ARRAY THAT PROVIDES VARIABLE EXPOSURE

CROSS-REFERENCE TO RELATED APPLICATIONS

The present application claims the benefit of U.S. Provisional Patent Application No. 61/922,168, filed Dec. 31, 2013, the contents of which are incorporated by reference herein.

FIELD OF THE INVENTION

The present disclosure relates to a laser line probe, and more particularly to a laser line probe having an improved dynamic range with respect to its image capture capability.

BACKGROUND OF THE INVENTION

The three-dimensional ("3D") physical characteristics of surfaces of objects may be measured using various non-contact techniques and devices. Such measurements may be carried out for various reasons, including part inspection, rapid prototyping, comparison of the actual part to a CAD model of the part, reverse engineering, 3D modeling, etc. Most often, these non-contact devices utilize triangulation-based techniques for processing the raw captured data representing the surface of an object into the resulting actual measurements of the object surface.

One type of triangulation-based, non-contact device is a laser line probe ("LLP"), which includes a projector and a camera. The projector includes a light source that emits a light, typically as a line. Thus, the LLP is also known as a line scanner. The projector also includes a lens that projects the emitted light onto an object in a relatively clear (unblurred) state. The emitted light may be laser light, partially coherent light, or incoherent light. The camera includes a camera-type imaging device, such as a charge-coupled device ("CCD") or CMOS photosensitive array. The camera also includes a camera lens that captures the pattern of light on the object surface and converts it into a relatively clear (unblurred) state on the photosensitive array. The camera is typically positioned adjacent the laser light source within the LLP device. The projector has a virtual emission point from which the line or stripe of light appears to "fan out" in an angle in one dimension and in a flat sheet in the orthogonal dimension. The camera has a camera perspective center through which rays of light from the pattern on the object appear to pass in traveling to the photosensitive array. The line segment between the virtual emission point and the camera perspective center is called the baseline, and the length of the baseline is called the baseline length.

In some cases, the LLP is shaped as a hand-held device. In other cases, it may be attached to a motorized device or fixed in position on a production line. The fan of light that strikes the surface of the object forms a relatively bright stripe of light on the object surface. The camera captures the 3D silhouette or profile of the laser stripe projected onto the object. For the case of a hand-held LLP, to cover all or some portion of an object with the line of light, the LLP is moved by the user such that the projected line stripe extends over all or at least the desired portion of the object within the LLP's field of view. That way, by moving the LLP over the object, hundreds of cross sections of the object surface are captured as 3D point clouds of raw data. Some modern LLPs can capture 60 frames, or stripes, of 3D data per second, or approximately 45,000 points of data per second. Signal processing electronics (e.g., a computer or a processor) are provided that run software which processes the 3D raw point cloud data into the resulting 3D image of the object that includes dimensional measurements as obtained by the LLP and its laser stripe and triangulation measurement process.

The image of the reflected line on the imaging device normally changes as the distance between the imaging device and the object surface changes. By knowing the baseline distance, the orientation of the projector and camera with respect to baseline, and the coordinates on the photosensitive array of the imaged pattern of light, known triangulation methods may be used to measure 3D coordinates of points on the surface of the object. That is, as the LLP is moved, the imaging device sees each projected line stripe. Any deviations on the photosensitive array from a straight line pattern may be translated into height variations on the object surface, thereby defining the object surface. In other words, the method described hereinabove digitizes the shape and position of the object within the field of view of the LLP. In this way the measured object may be checked against a CAD design model of the same object to determine any discrepancies therebetween.

Portable articulated arm coordinate measuring machines ("AACMMs") may include a tactile probe configured to be brought into contact with an object to determine 3D coordinates of the object surface. AACMMs have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a "hard" contact touch measurement probe (e.g., a ball) along the surface of the part or object to be measured. The measurement data are then recorded and provided to the user. In some cases, the data are provided to the user in visual form, for example, in 3D form on a computer screen. In other cases, the data are provided to the user in numeric form, for example when measuring the diameter of a hole, the text "Diameter=1.0034" is displayed on a computer screen.

An example of a prior art portable AACMM is disclosed in commonly assigned U.S. Pat. No. 5,402,582 ("the '582 patent"), which is incorporated herein by reference in its entirety. The '582 patent discloses a 3D measuring system comprised of a manually-operated AACMM having a support base on one end and a "hard" measurement probe at the other end. Commonly assigned U.S. Pat. No. 5,611,147 ("the '147 patent"), which is incorporated herein by reference in its entirety, discloses a similar AACMM. In the '147 patent, the AACMM has a number of features including an additional rotational axis at the probe end, thereby providing for an arm with either a two-two-two or a two-two-three axis configuration (the latter case being a seven axis arm).

It is generally known and accepted practice to attach a laser line probe to the probe end of an AACMM. The result is a fully integrated, portable, contact/non-contact measurement device. That is, the AACMM having an LLP attached thereto provides for both contact measurements of an object through use of the "hard" probe of the AACMM and for non-contact measurements of the object through use of the LLP's laser and imaging device. More specifically, the combination AACMM and LLP allows users to quickly inspect or reverse engineer complex and organic shapes via laser scanning, as well as to capture prismatic elements with the relatively high accuracy that contact metrology provides.

When combined as such, the AACMM and LLP may have the LLP carry out some or all of the processing of the 3D captured point cloud data using the signal processing electronics (e.g., computer or processor) within or associated with (e.g., located apart from) the AACMM. However, the LLP may have its own signal processing electronics located within the LLP or associated with the LLP (e.g., a stand-alone computer) to perform the necessary signal processing. In this case, the LLP may need to connect with a display device to view the captured data representing the object. Also, in this case the LLP may operate as a stand-alone device without the need to connect with an AACMM or similar device.

One important characteristic of any laser line probe is the dynamic range of the imaging device within the LLP. Simply put, the dynamic range of the imaging device is the range bounded on one end by the amount of relatively bright object surface portions that the imaging device is capable of accurately capturing and bounded on the other end by the amount of relatively dark object surface portions that the imaging device is capable of accurately capturing. Stated another way, the dynamic range of an imaging device is the ratio of the largest non-saturating input signal to the smallest detectable input signal. Dynamic range essentially quantifies the ability of an imaging sensor to adequately image both the highlights and the dark shadows of an object or of a larger scene. A typical real-world object or scene desired to be imaged may have a wide range of brightness values (or contrast variations) across the object surface or surfaces depending, in part, on the ambient light illuminating the object at any one point in time. For example, it is not uncommon for an object or scene to vary in brightness by 100 decibels or more.

The dynamic range required of an LLP for optimal determination of 3D coordinates of a surface is equal to the ratio of reflected optical power from the most reflective to the least reflective portions of an object surface. Dynamic range may be described as a linear ratio or, more commonly, as a logarithmic ratio in units of decibels ("dB"). The required dynamic range for a particular measurement depends partly on the material, color, and surface finish of the object surface, partly on the distances from a surface point to the projector and camera, and partly on the angles of incidence and reflectance of the projected and reflected light, respectively.

The dynamic range of an image sensor is the ratio of the largest optical energy to the smallest optical energy received by a sensing element within the image sensor. To provide a valid reading, the dynamic range received by a sensing element should be within the linear range of the sensing element, which is to say that the energy cannot be as large as to saturate or so small as to be noise limited. To perform at an optimal level, the dynamic range of the imaging device should be equal to or greater than the dynamic range required of a particular measurement. Most commercially available imaging devices, e.g., CCD's or CMOS imagers, have a dynamic range less than 100 decibels.

An LLP with a relatively low dynamic range imaging device (e.g., a CCD camera or CMOS photosensitive array) results in a reproduced image that may be too dark is some areas and/or too light (i.e., saturated) in other areas. Thus, it may be difficult, if not impossible, to accurately determine 3D coordinates with such an LLP.

As a result, many devices and techniques exist in the prior art for extending or increasing the dynamic range of imaging devices. However, these techniques and devices tend to be lacking somewhat in the amount of increase in the dynamic range of the imaging device.

While existing laser line probes are suitable for their intended purposes, what is needed is a laser line probe having an imaging device with improved (i.e., increased) high dynamic range.

SUMMARY OF THE INVENTION

According to an embodiment of the present invention, a line scanner for measuring three-dimensional coordinates of a surface of an object includes a projector including a light source and a projector lens, the projector configured to project light from the light source through the lens as a line of light at the surface of the object. The line scanner also includes a camera including a photosensitive array and a camera lens, the photosensitive array including a two-dimensional array of light sensors, the array of light sensors having M rows and N columns, where M and N are integers, the camera further including control electronics configured to control exposure time of each light sensor in the array of light sensors and to control readout time of each light sensor in the array of light sensors, the exposure time of each light sensor in the array of light sensors being controlled in the one of rows and the columns of the light sensors, the readout time of each light sensor in the array of light sensors being controlled in one of rows and the columns, the exposure time of each light sensor in the array of light sensors being controlled such that the array of light sensors is controlled in a non-sequential manner, each of the light sensors in the array of light sensors configured to convert an amount of optical energy captured by each of the light sensors into a digital signal value, the optical energy captured by the light sensors being from a reflected line of light from the surface of the object, the reflected line of light being the projected line of light reflected from the surface of the object. The line scanner further includes a processor configured to receive the digital signal values and to calculate two of the three-dimensional coordinates of the surface of the object therefrom.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including

DETAILED DESCRIPTION

Figure 1A:
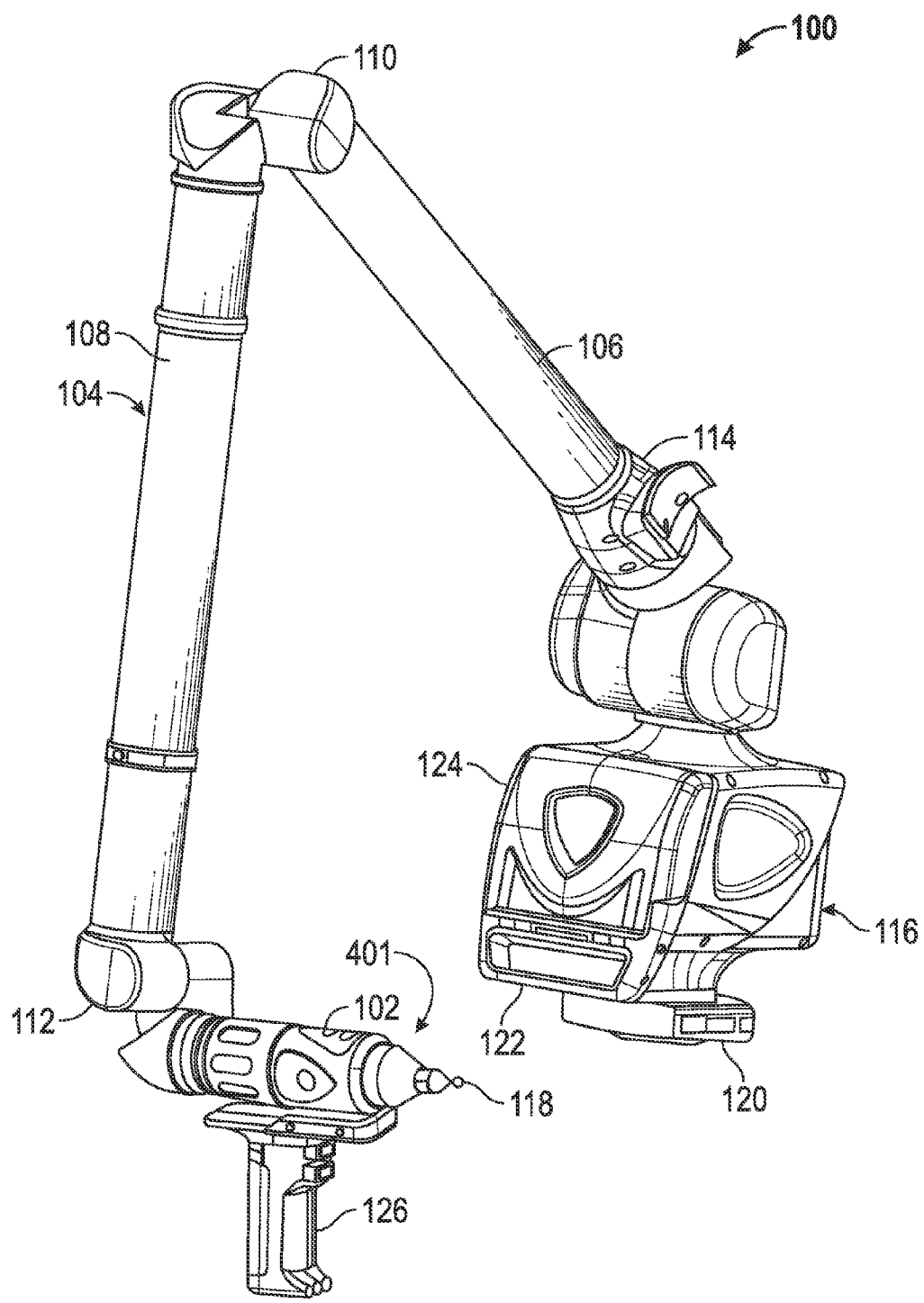
FIGS. 1A and 1B, are perspective views of a portable articulated arm coordinate measuring machine ("AACMM") having embodiments of various aspects of the present invention therewithin.
Figure 1B:
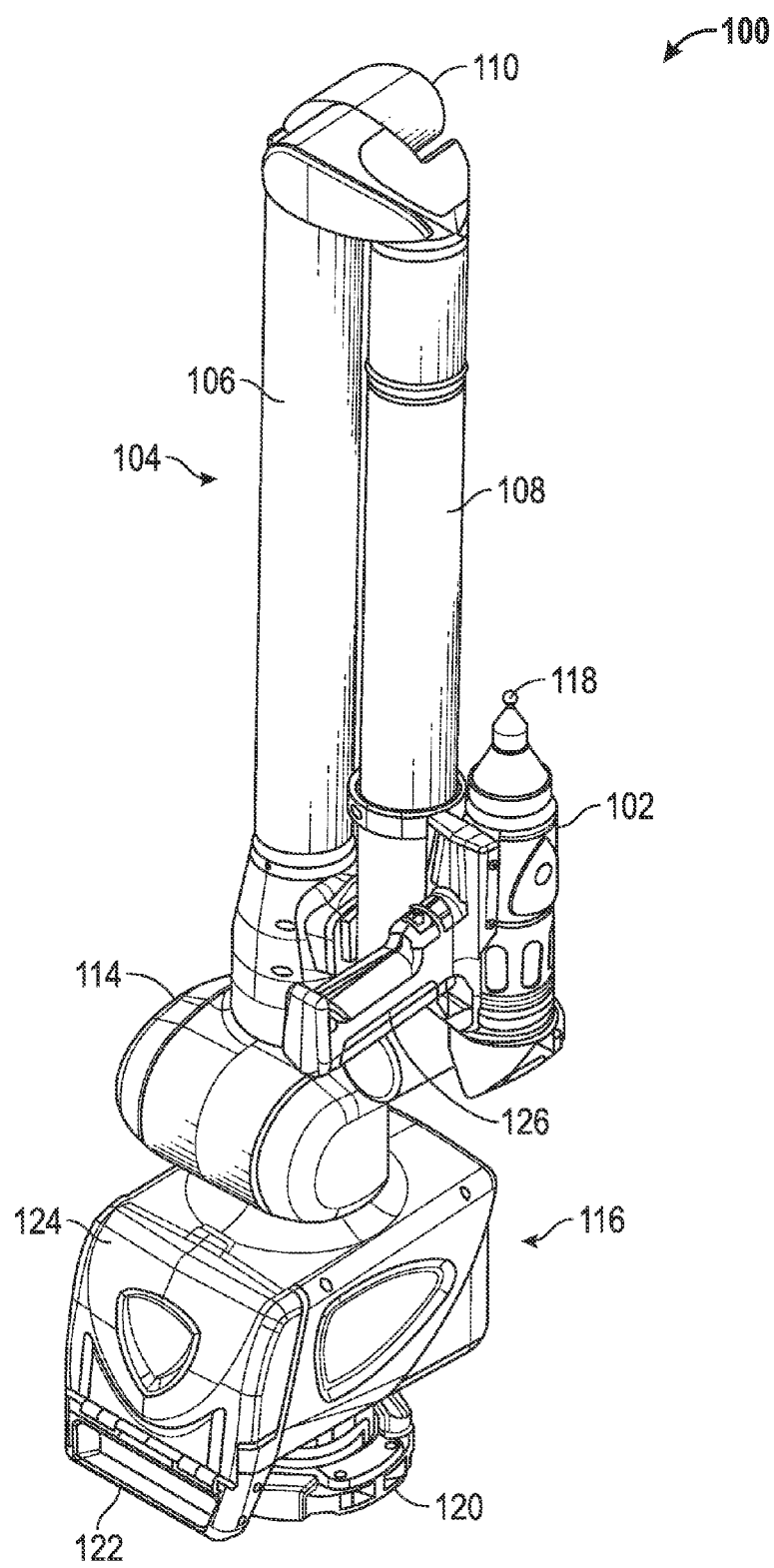

FIGS. 1A and 1B illustrate, in perspective, an articulated arm coordinate measuring machine ("AACMM") 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a probe 118, in the seventh axis of the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. As discussed in more detail hereinafter with reference to FIG. 10 et seq., the handle 126 may be replaced or interchanged with another device such as a laser line probe ("LLP"), which is configured to emit a line of laser light to an object and to capture or image the laser light on a surface of the object with an imaging device (e.g., a camera) that is part of the LLP, to thereby provide for non-contact measurement of the dimensions of three-dimensional objects. This interchangeable feature and use of an LLP has the advantage in allowing the operator to make both contact and non-contact measurements with the same AACMM 100. However, it should be understood that the LLP may be a standalone device, as described in more detail hereinafter. That is, the LLP may be fully functional and operable by itself without any type of connection to the AACMM 100 or similar device.

In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as the LLP. In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2D, the removable handle 126 may also include an electrical connector that allows electrical power and data to be exchanged with the handle 126 and the corresponding electronics located in the probe end 401.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail hereinafter. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ("the '582 patent").

The base 116 may include an attachment device or mounting device 120. The mounting device 120 allows the AACMM 100 to be removably mounted to a desired location, such as an inspection table, a machining center, a wall or the floor, for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic circuit having an electronic data processing system that includes two primary components: a base processing system that processes the data from the various encoder systems within the AACMM 100 as well as data representing other arm parameters to support three-dimensional ("3D") positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a laser line probe that can be mounted in place of the removable handle 126 on the AACMM 100). The electronics that support these peripheral hardware devices or features may be located in each of the bearing cartridge groupings 110, 112, 114 located within the portable AACMM 100.

Figure 2:
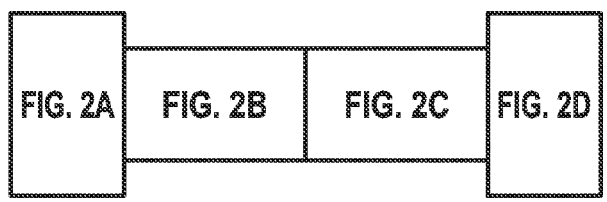
FIG. 2, including FIGS. 2A-2D taken together, is a block diagram of electronics utilized as part of the AACMM of FIG. 1 in accordance with an embodiment.

FIG. 2 is a block diagram of electronics utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

Figure 2A:
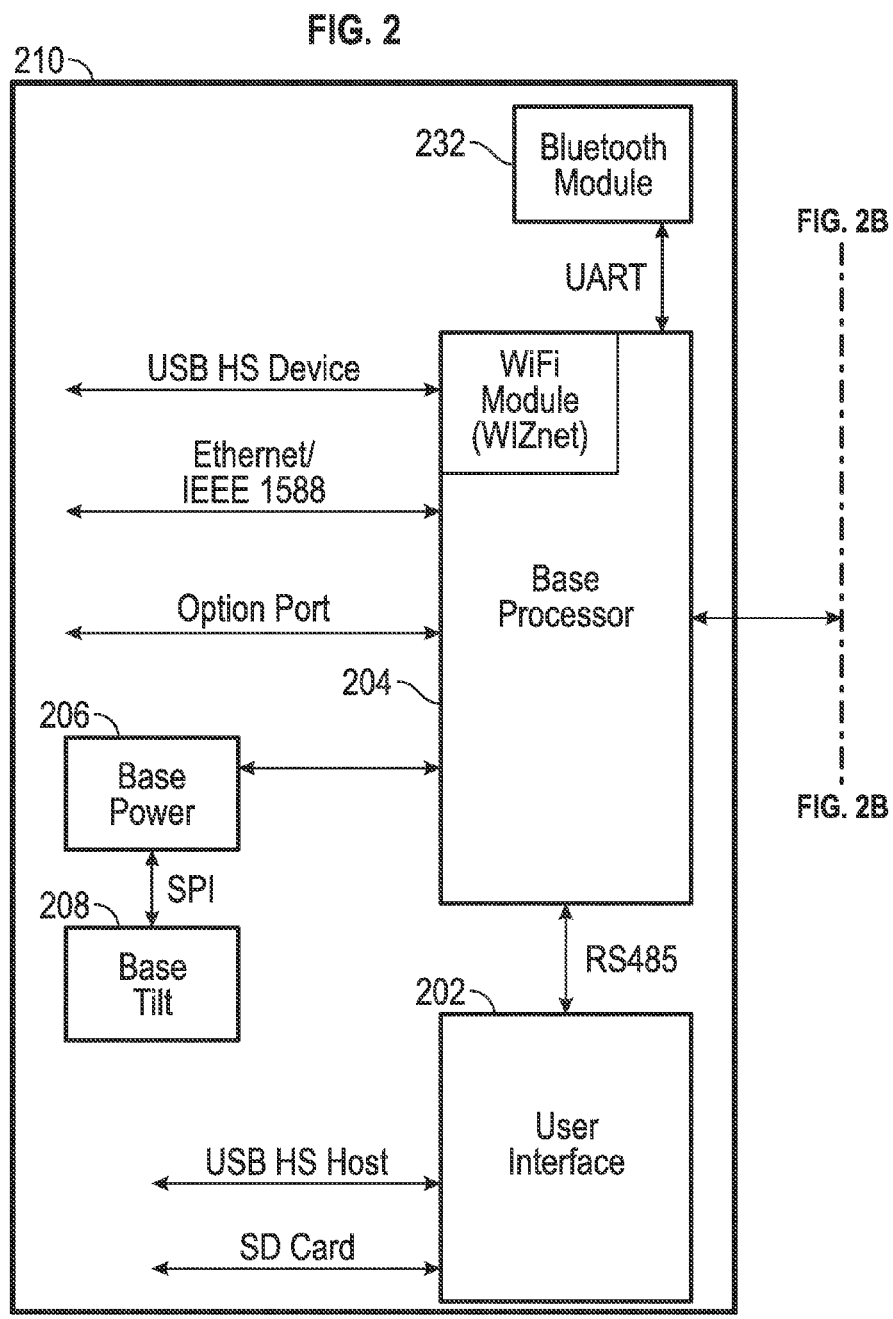
Figure 2B:
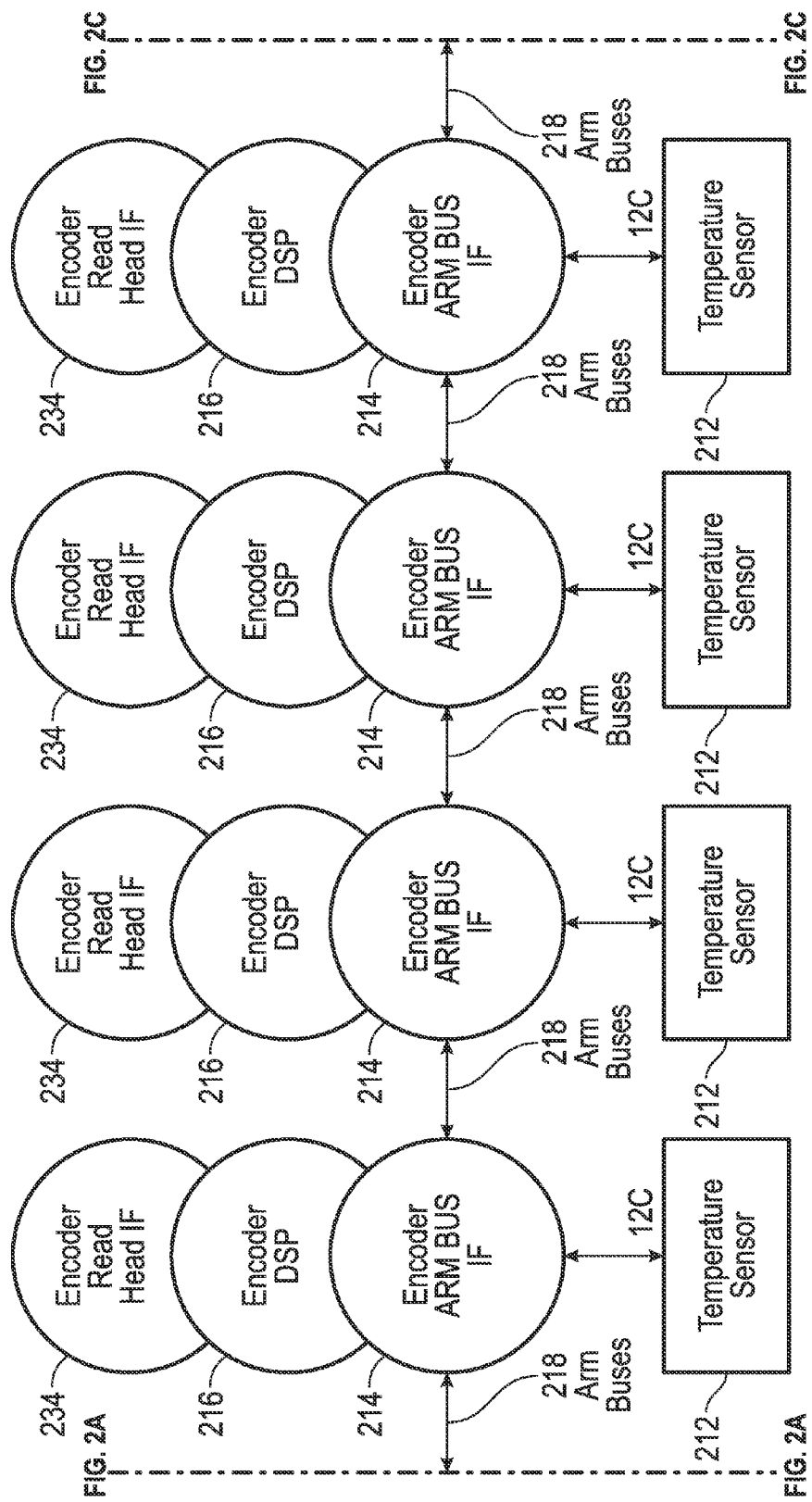

As shown in FIG. 2A and FIG. 2B, the electronic data processing system 210 is in communication with the aforementioned plurality of encoder systems via one or more arm buses 218. In the embodiment depicted in FIG. 2B and FIG. 2C, each encoder system generates encoder data and includes: an encoder arm bus interface 214, an encoder digital signal processor ("DSP") 216, an encoder read head interface 234, and a temperature sensor 212. Other devices, such as strain sensors, may be attached to the arm bus 218.

Figure 2D:
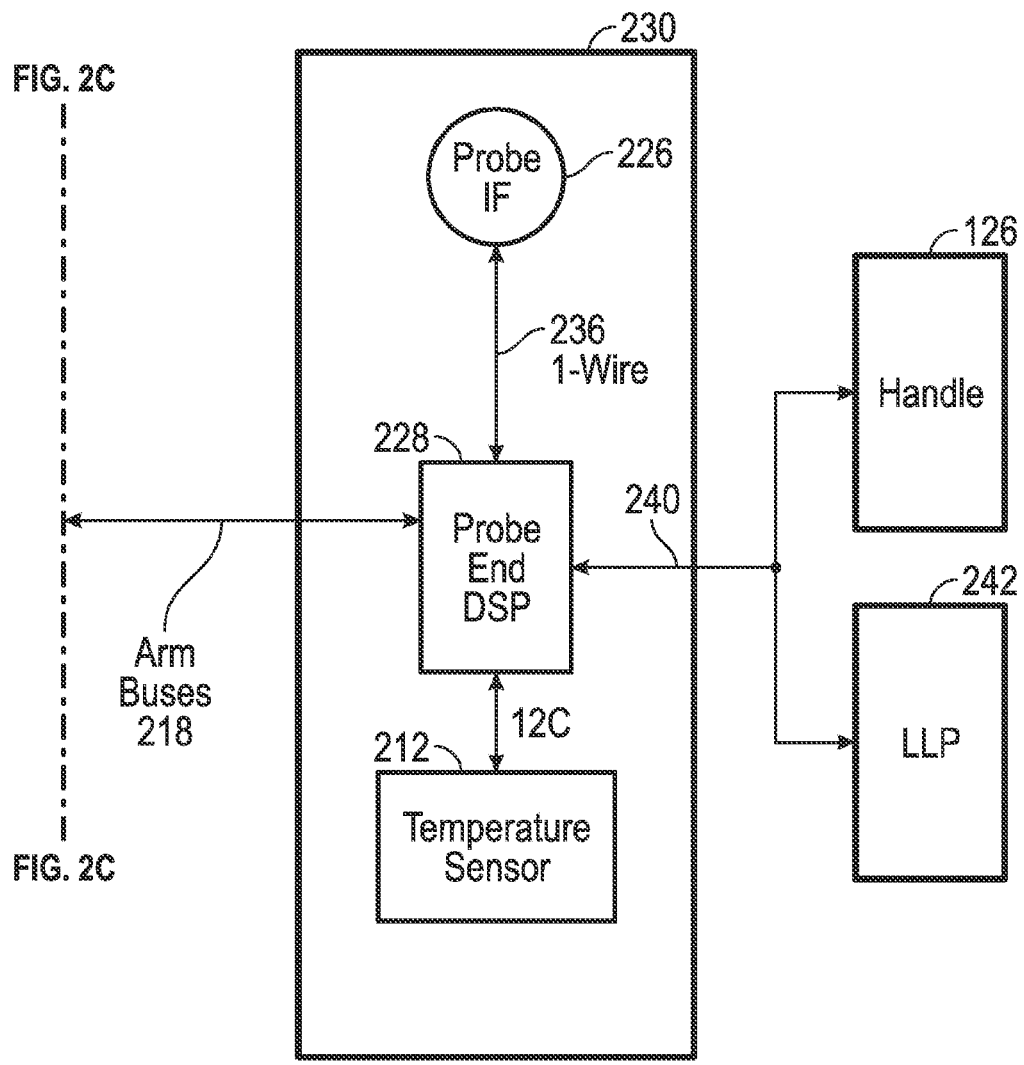

Also shown in FIG. 2D are probe end electronics 230 that are in communication with the arm bus 218. The probe end electronics 230 include a probe end DSP 228, a temperature sensor 212, a handle/device interface bus 240 that connects with the handle 126 or the laser line probe ("LLP") 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the LLP 242 communicating with the probe end electronics 230 of the AACMM 100 via the interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-Wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

Figure 3A:
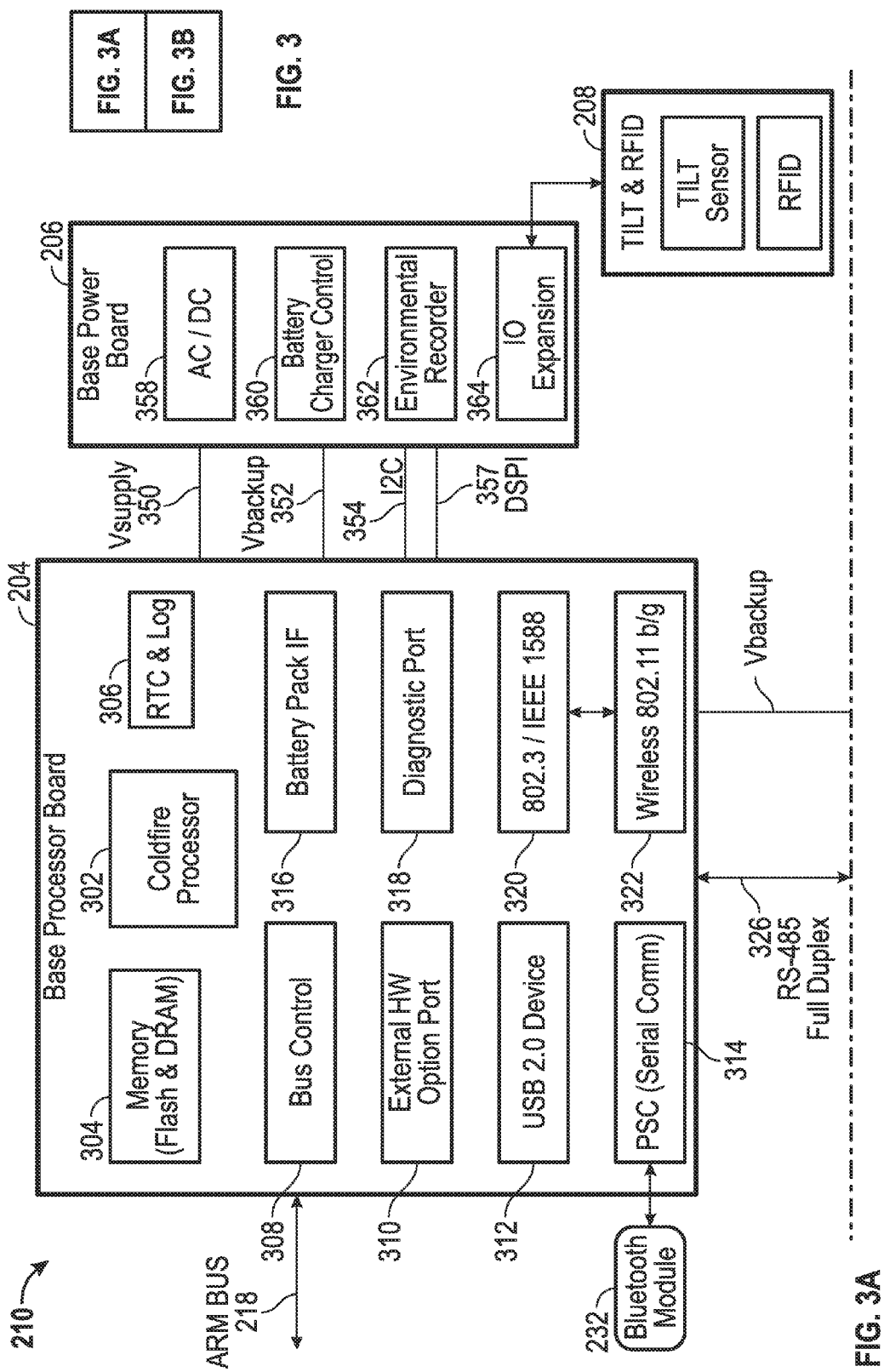
FIG. 3, including FIGS. 3A and 3B taken together, is a block diagram describing detailed features of the electronic data processing system of FIG. 2 in accordance with an embodiment.

In an embodiment shown in FIG. 3A, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as the LLP 242. A real time clock ("RTC") and log 306, a battery pack interface ("IF") 316, and a diagnostic port 318 are also included in the functionality in an embodiment of the base processor board 204 depicted in FIG. 3A.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers ("IEEE") 1588), with a wireless local area network ("WLAN") via a LAN function 322, and with Bluetooth module 232 via a parallel to serial communications ("PSC") function 314. The base processor board 204 also includes a connection to a universal serial bus ("USB") device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface ("IF") 326. In an embodiment, the base processor 204 also sends the raw measurement data to an external computer.

Figure 3B:
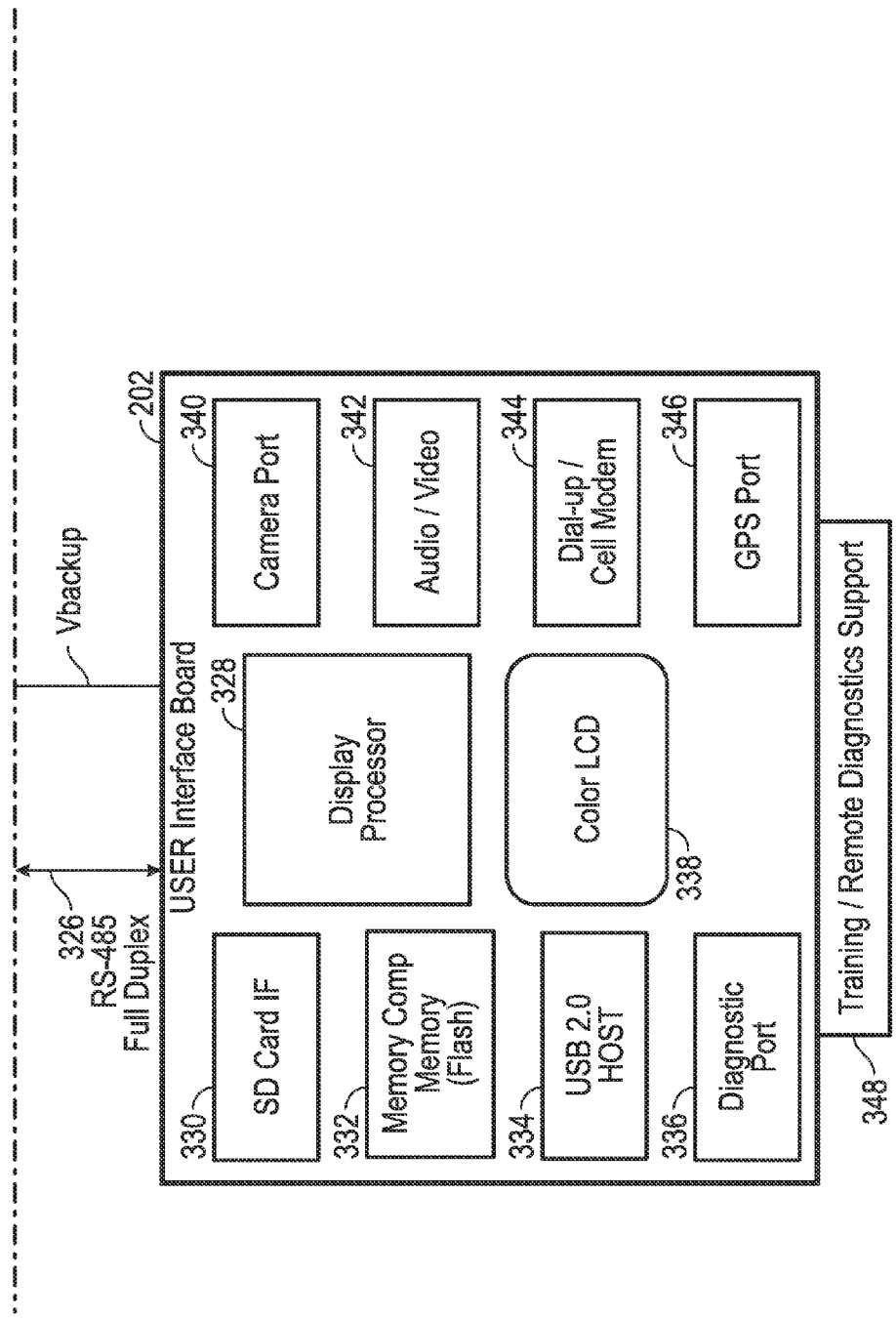
Figure 4:
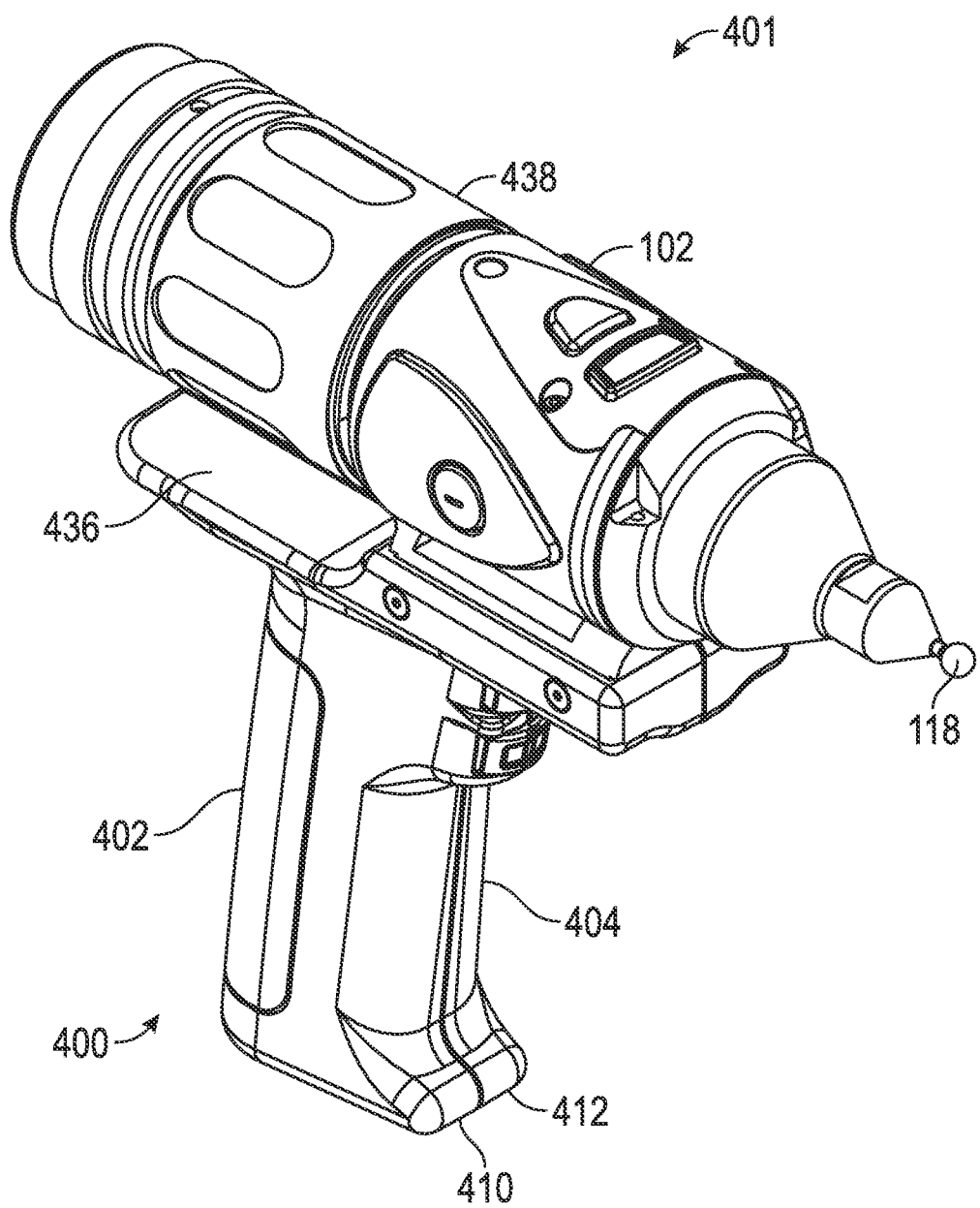
FIG. 4 is an isometric view of the probe end of the AACMM of FIG. 1.

Turning now to the user interface board 202 in FIG. 3B, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display ("LCD") 338 (e.g., a touch screen LCD) user interface, the user interface board 202 includes several interface options including a secure digital ("SD") card interface 330, a memory 332, a USB Host interface 334, a diagnostic port 336, a camera port 340, an audio/video interface 342, a dial-up/cell modem 344 and a global positioning system ("GPS") port 346.

The electronic data processing system 210 shown in FIG. 3A also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit ("I2C") serial single ended bus 354 as well as via a DMA serial peripheral interface ("DSPI") 357. The base power board 206 is connected to a tilt sensor and radio frequency identification ("RFID") module 208 via an input/output ("I/O") expansion function 364 implemented in the base power board 206.

Though shown as separate components, in other embodiments all or a subset of the components may be physically located in different locations and/or functions combined in different manners than that shown in FIG. 3A and FIG. 3B. For example, in one embodiment, the base processor board 204 and the user interface board 202 are combined into one physical board.

Figure 7:
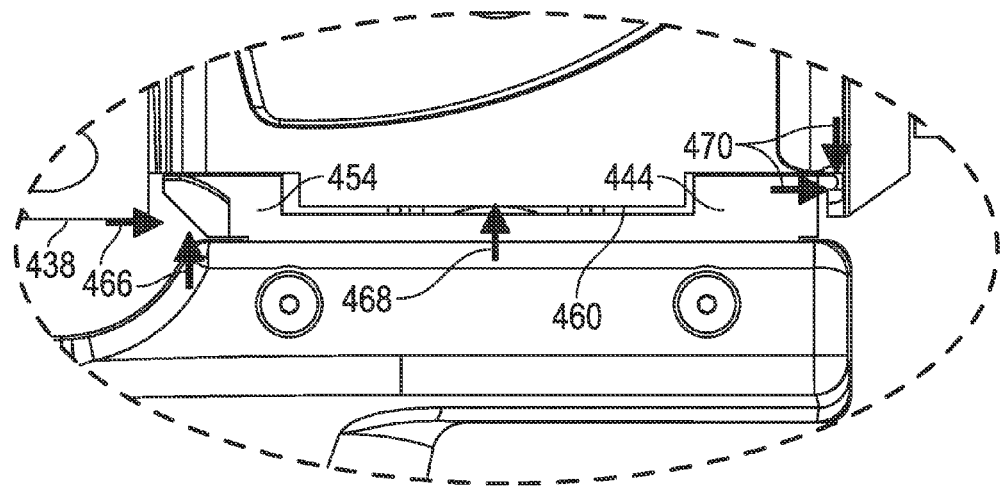
FIG. 7 is an enlarged partial side view of the interface portion of the probe end of FIG. 6.
Figure 8:
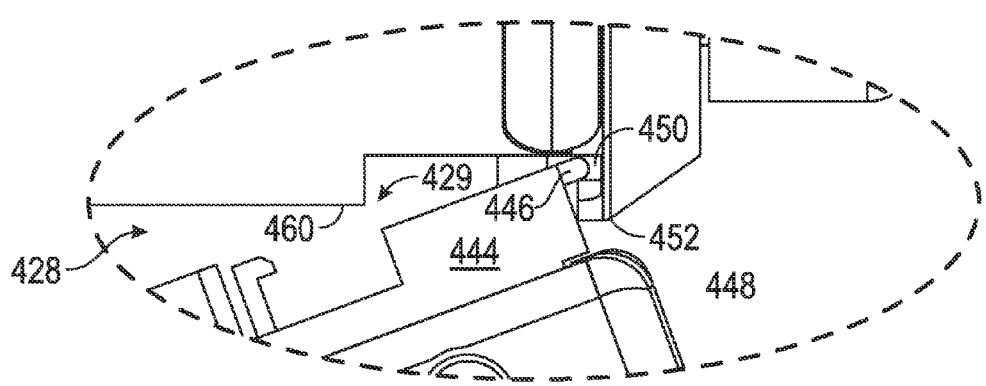
FIG. 8 is another enlarged partial side view of the interface portion of the probe end of FIG. 5.
Figure 9:
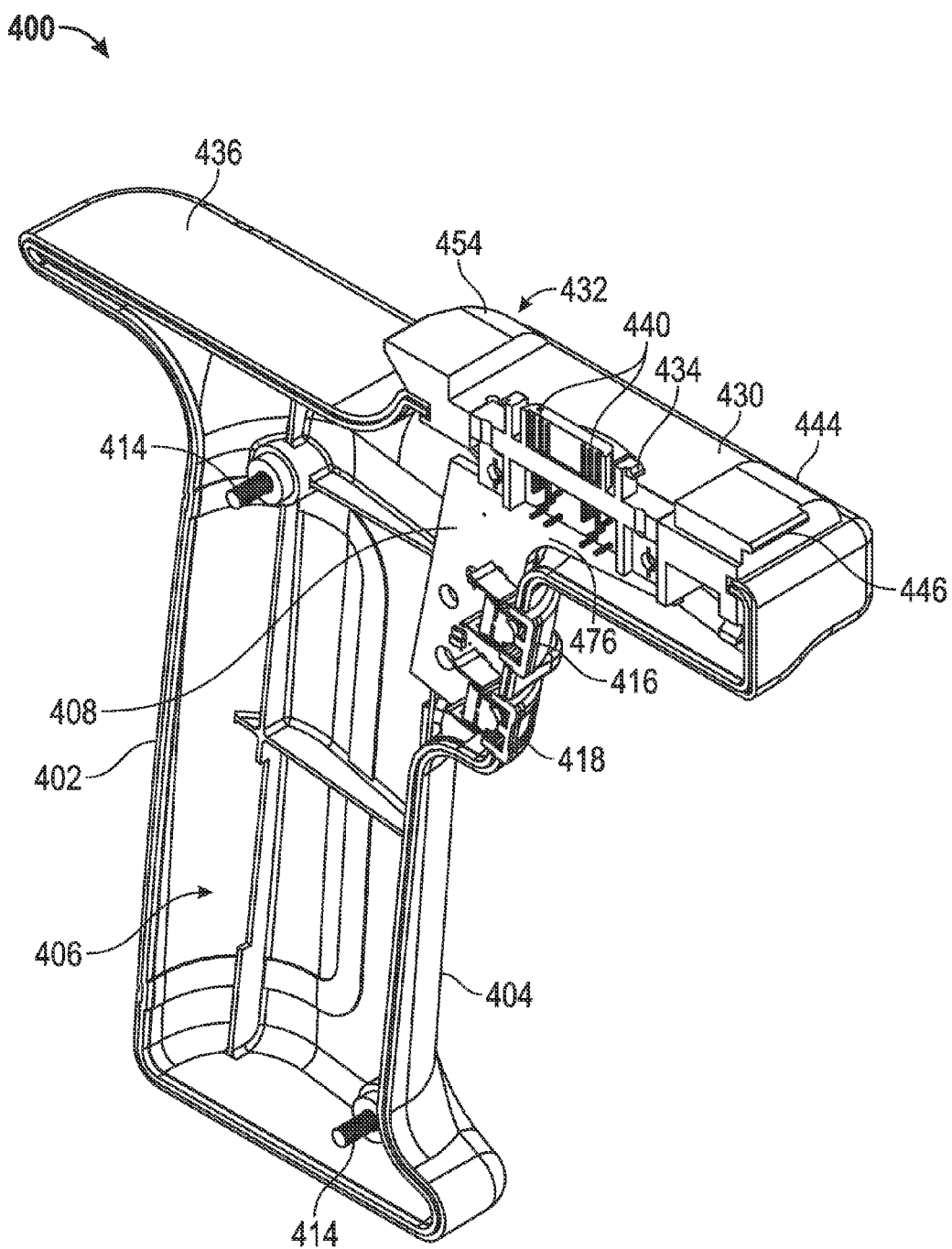
FIG. 9 is an isometric view partially in section of the handle of FIG. 4.

Referring now to FIGS. 4-9, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 is a thin wall structure having a cavity 406 (FIG. 9). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be wired (e.g. via controller 420) or may be a direct or indirect wireless connection (e.g. Bluetooth or IEEE 802.11) or a combination of wired and wireless connections. In the exemplary embodiment, the enclosure 402 is formed in two halves 410, 412, such as from an injection molded plastic material for example. The halves 410, 412 may be secured together by fasteners, such as screws 414 for example. In other embodiments, the enclosure halves 410, 412 may be secured together by adhesives or ultrasonic welding for example.

The handle portion 404 also includes buttons or actuators 416, 418 that may be manually activated by the operator. The actuators 416, 418 are coupled to the controller 408 that transmits a signal to a controller 420 within the probe housing 102. In the exemplary embodiments, the actuators 416, 418 perform the functions of actuators 422, 424 located on the probe housing 102 opposite the device 400. It should be appreciated that the device 400 may have additional switches, buttons or other actuators that may also be used to control the device 400, the AACMM 100 or vice versa. Also, the device 400 may include indicators, such as LEDs, sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing finders or operators with prosthetic arms). Further, the handle portion 404 may be removed and the probe housing 102 used by itself when clearance space is limited. As discussed above, the probe end 401 may also comprise the shaft of the seventh axis of AACMM 100. In this embodiment the device 400 may be arranged to rotate about the AACMM seventh axis.

The probe end 401 includes a mechanical and electrical interface 426 having a first connector 429 (FIG. 8) on the device 400 that cooperates with a second connector 428 on the probe housing 102. The connectors 428, 429 may include electrical and mechanical features that allow for coupling of the device 400 to the probe housing 102. In one embodiment, the interface 426 includes a first surface 430 having a mechanical coupler 432 and an electrical connector 434 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. This offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The electrical connector 434 extends from the first surface 430 and includes one or more connector pins 440 that are electrically coupled in asynchronous bidirectional communication with the electronic data processing system 210 (FIGS. 2 and 3), such as via one or more arm buses 218 for example. The bidirectional communication connection may be wired (e.g. via arm bus 218), wireless (e.g. Bluetooth or IEEE 802.11), or a combination of wired and wireless connections. In one embodiment, the electrical connector 434 is electrically coupled to the controller 420. The controller 420 may be in asynchronous bidirectional communication with the electronic data processing system 210 such as via one or more arm buses 218 for example. The electrical connector 434 is positioned to provide a relatively quick and secure electronic connection with electrical connector 442 on probe housing 102. The electrical connectors 434, 442 connect with each other when the device 400 is attached to the probe housing 102. The electrical connectors 434, 442 may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Figure 5:
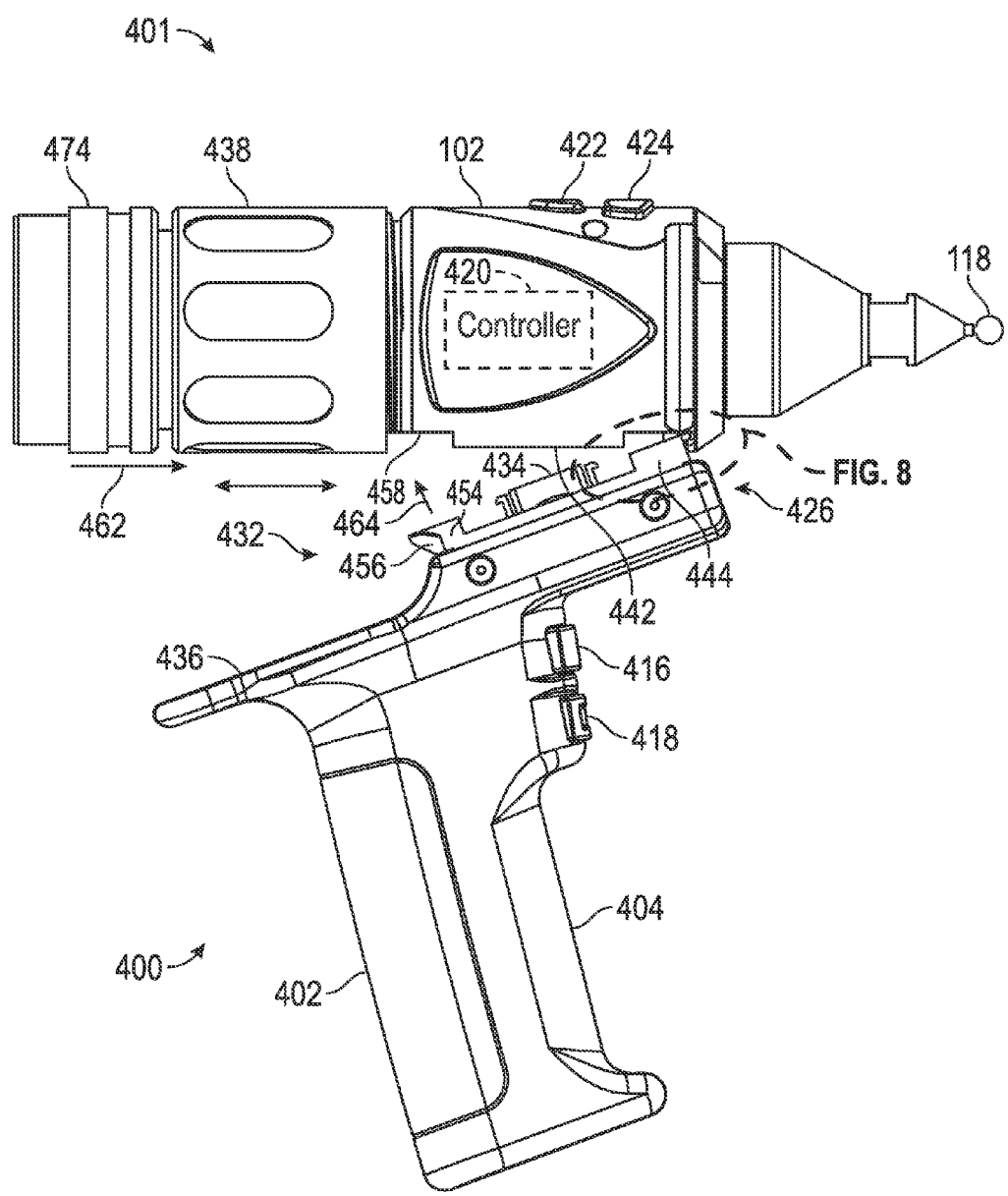
FIG. 5 is a side view of the probe end of FIG. 4 with the handle being coupled thereto.

Opposite the first projection 444, the mechanical coupler 432 may include a second projection 454. The second projection 454 may have a keyed, notched-lip or ramped interface surface 456 (FIG. 5). The second projection 454 is positioned to engage a fastener associated with the probe housing 102, such as collar 438 for example. As will be discussed in more detail below, the mechanical coupler 432 includes a raised surface projecting from surface 430 that is adjacent to or disposed about the electrical connector 434 which provides a pivot point for the interface 426 (FIGS. 7 and 8). This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

Figure 6:
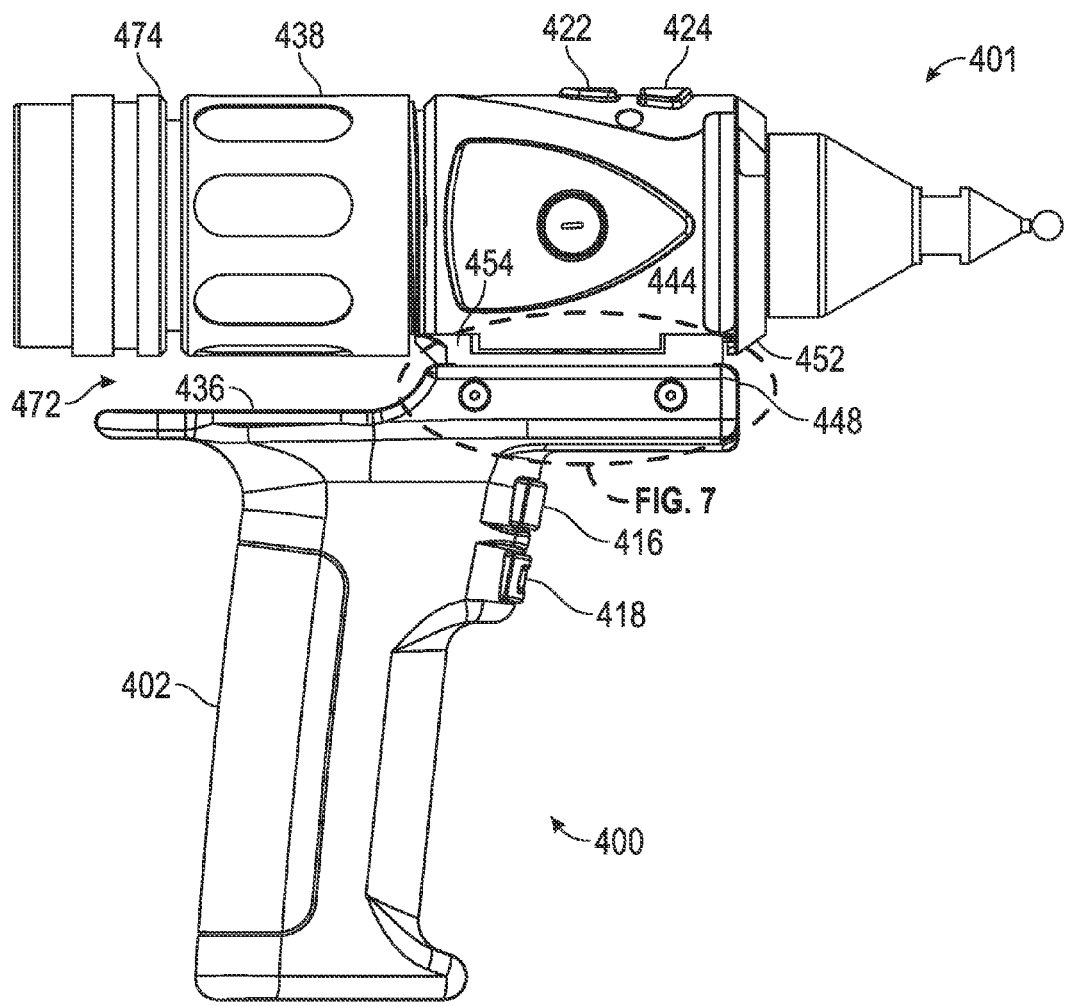
FIG. 6 is a side view of the probe end of FIG. 4 with the handle attached.

To couple the device 400 to the probe housing 102, the lip 446 is inserted into the slot 450 and the device is pivoted to rotate the second projection 454 toward surface 458 as indicated by arrow 464 (FIG. 5). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 5 includes arrows 462, 464 to show the direction of movement of the device 400 and the collar 438. FIG. 7 includes arrows 466, 468, 470 to show the direction of applied pressure within the interface 426 when the collar 438 is tightened. It should be appreciated that the offset distance of the surface 436 of device 400 provides a gap 472 between the collar 438 and the surface 436 (FIG. 6). The gap 472 allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

Embodiments of the interface 426 allow for the proper alignment of the mechanical coupler 432 and electrical connector 434 and also protect the electronics interface from applied stresses that may otherwise arise due to the clamping action of the collar 438, the lip 446 and the surface 456. This provides advantages in reducing or eliminating stress damage to circuit board 476 mounted electrical connectors 434, 442 that may have soldered terminals. Also, embodiments provide advantages over known approaches in that no tools are required for a user to connect or disconnect the device 400 from the probe housing 102. This allows the operator to manually connect and disconnect the device 400 from the probe housing 102 with relative ease.

Due to the relatively large number of shielded electrical connections possible with the interface 426, a relatively large number of functions may be shared between the AACMM 100 and the device 400. For example, switches, buttons or other actuators located on the AACMM 100 may be used to control the device 400 or vice versa. Further, commands and data may be transmitted from electronic data processing system 210 to the device 400. In one embodiment, the device 400 is a video camera that transmits data of a recorded image to be stored in memory on the base processor 204 or displayed on the display 328. In another embodiment the device 400 is an image projector that receives data from the electronic data processing system 210. In addition, temperature sensors located in either the AACMM 100 or the device 400 may be shared by the other. It should be appreciated that embodiments of the present invention provide advantages in providing a flexible interface that allows a wide variety of accessory devices 400 to be quickly, easily and reliably coupled to the AACMM 100. Further, the capability of sharing functions between the AACMM 100 and the device 400 may allow a reduction in size, power consumption and complexity of the AACMM 100 by eliminating duplicity.

In one embodiment, the controller 408 may alter the operation or functionality of the probe end 401 of the AACMM 100. For example, the controller 408 may alter indicator lights on the probe housing 102 to either emit a different color light, a different intensity of light, or turn on/off at different times when the device 400 is attached versus when the probe housing 102 is used by itself. In one embodiment, the device 400 includes a range finding sensor (not shown) that measures the distance to an object. In this embodiment, the controller 408 may change indicator lights on the probe housing 102 in order to provide an indication to the operator how far away the object is from the probe tip 118. In another embodiment, the controller 408 may change the color of the indicator lights based on the quality of the image acquired by the LLP 242. This provides advantages in simplifying the requirements of controller 420 and allows for upgraded or increased functionality through the addition of accessory devices.

Figure 10:
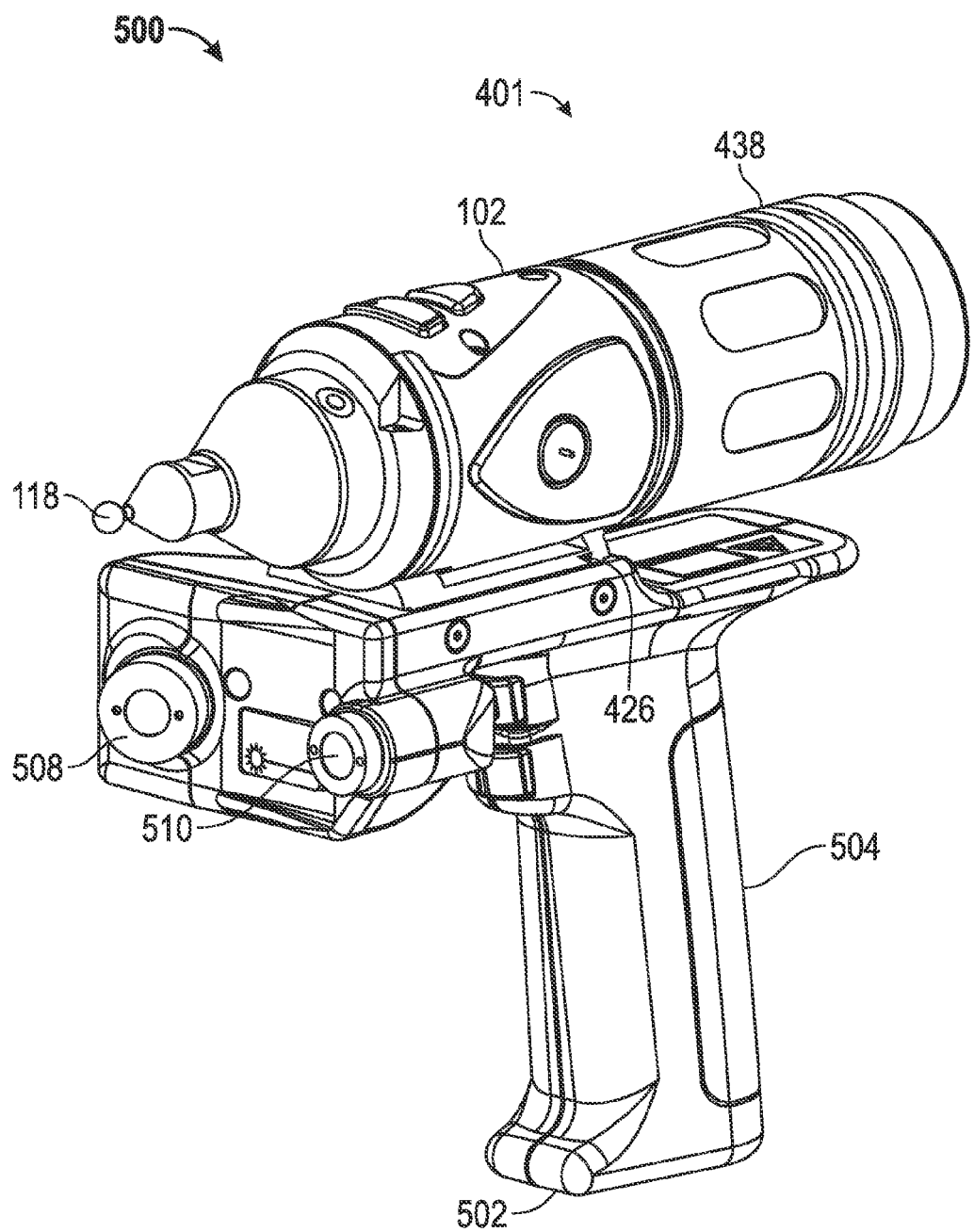
FIG. 10 is an isometric view of the probe end of the AACMM of FIG. 1 with a laser line probe having a single camera attached.
Figure 11:
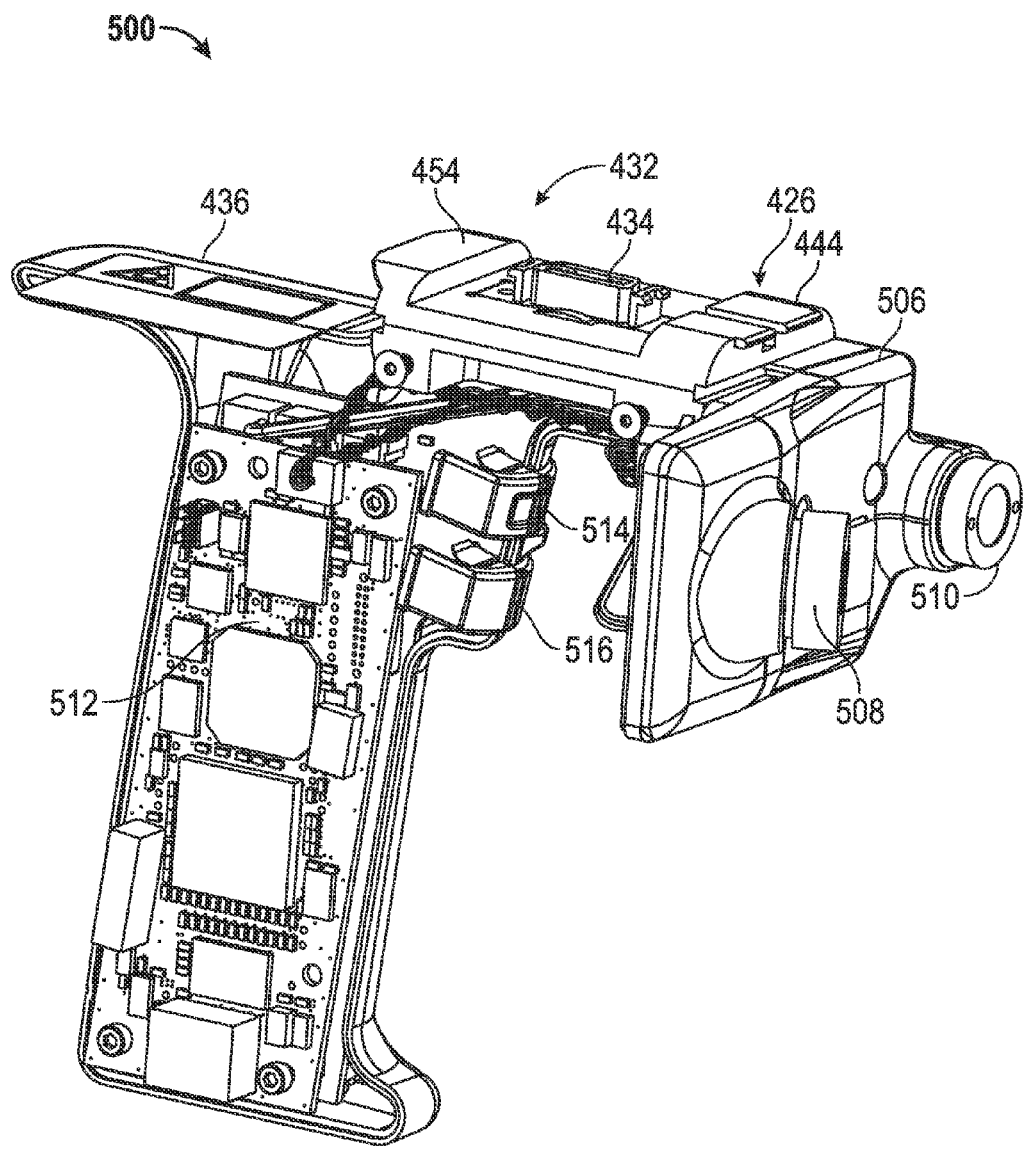
FIG. 11 is an isometric view partially in section of the laser line probe of FIG. 10.

Referring to FIGS. 10-11, embodiments of the present invention provide advantages for increasing the dynamic range of a laser line probe ("LLP") 500, which may be part of a measurement unit such as the AACMM 100 or part of a non-measurement unit such as a robot or other device that moves in a linear and/or a non-linear manner. In the alternative, the LLP 500 may be a hand-held, standalone device not connected with the AACMM 100 or any other device. The LLP 500 may be the same as or somewhat similar to the LLP 242 as referenced hereinabove with respect to FIGS. 1-9 in particular, or may be some other type of laser line scanner in general.

The LLP 500 provides for non-contact measurements of the regular and/or irregular surface features of an object, typically, if connected with the AACMM 100, in the same frame of reference as that of the hard probe 118 of the AACMM 100, as discussed hereinabove. Further, the calculated three-dimensional coordinates of the surface points of the object provided by the LLP 500 are based on the known principles of triangulation, as was explained in more detail hereinabove. The LLP 500 may include an enclosure 502 with a handle portion 504. The LLP 500 may also include an interface 426 on one end that mechanically and electrically couples the LLP 500 to the probe housing 102 as described hereinabove. The interface 426 allows the LLP 500 to be coupled and removed from the AACMM 100 quickly and easily without requiring additional tools.

Adjacent the interface 426, the enclosure 502 has a portion 506 that includes a projector 508 and a camera 510. In the exemplary embodiment, the projector 508 uses a light source that generates a straight line or "stripe" which is projected onto an object surface. The light source may be, for example and without limitation, a laser, a superluminescent diode ("SLD"), an incandescent light, a light emitting diode ("LED"), or some other similar type of light projecting or emitting device. The projected light may be visible or invisible, but visible light may be more convenient and advantageous to use in some cases. As the LLP 500 is moved by moving the AACMM 100 or by moving the standalone LLP 500 by hand, the projected line or stripe eventually covers the entire surface area or a desired portion of the surface area of the object whose surface physical characteristics are being measured. This is done in relatively small, cross-section segments or increments, each increment being represented by the projected line or stripe at one location on the surface of the object.

The camera 510 typically includes a lens or lens system and a solid state, digital imaging sensor. The lens or lens system is typically used to filter out ambient light. The digital imaging sensor is typically a photosensitive array that may be a charge-coupled device ("CCD") two-dimensional ("2D") area sensor or a complementary metal-oxide-semiconductor ("CMOS") 2D area sensor, for example, or it may be some other type of light capture device. Each imaging sensor may comprise a 2D array (i.e., rows, columns) having a plurality of light sensing elements. Each light sensing element typically contains or comprises at least one photodetector (e.g., photodiode) that converts the captured or sensed light energy (i.e., photons) into an amount of electric charge which is stored within the corresponding well within each light sensing element, where the charge in each well may be added or integrated and read out as a voltage value. The voltage values are typically converted into digital values for manipulation by a computer or processor by an analog-to-digital converter ("ADC"). Each digital value represents an amount of brightness at a particular physical location on the surface of the object as imaged by the sensor from the light reflected off of the object surface and captured by the digital imaging sensor at a particular location within the photosensitive array. Typically for a CMOS imaging sensor chip, the ADC is contained within the sensor chip, while for a CCD imaging sensor chip, the ADC is usually included outside the sensor chip on a circuit board.

Use of these types of digital imaging sensors most often leads to relatively low overall dynamic range in the LLP 500. As stated hereinabove, simply put, the dynamic range of the digital imaging device is the range bounded on one end by the amount of relatively bright object surface portions that the imaging device is capable of accurately capturing and bounded on the other end by the amount of relatively dark object surface portions that the imaging device is capable of accurately capturing. Stated another way, the dynamic range of the imaging device is the ratio of the largest non-saturating input signal to the smallest detectable input signal (i.e., such detectable signal being distinguishable from an amount of noise typically residing at the low input signal levels).

Defined as such, relatively low dynamic range is usually caused by the fact that the digital output of the digital imaging sensor from the ADC is often only characterized by eight binary bits, which results in the relatively small value of 256 different levels of brightness information being able to be provided by the digital imaging sensor. Thus, a typical real world object scanned by the LLP 500 most often results in the resulting scanned image being relatively too bright in some areas and/or relatively too dark in other areas. In other words, the LLP 500 does a relatively poor job of accurately imaging the real world object because the digital imaging sensor does not contain enough resolution (i.e., enough binary output bits) to accurately image or represent both the relatively light and dark areas of the object. Embodiments of the present invention described and illustrated herein provide for improvements or increases in the dynamic range of the LLP 500.

In an exemplary embodiment, the projector 508 and camera 510 are oriented to enable reflected light from an object to be imaged by the photosensitive array. In one embodiment, the LLP 500 is offset from the probe tip 118 to enable the LLP 500 to be operated without interference from the probe tip 118. In other words, the LLP 500 may be operated with the probe tip 118 in place. Further, it should be appreciated that the LLP 500 is substantially fixed relative to the probe tip 118 so that forces on the handle portion 504 do not influence the alignment of the LLP 500 relative to the probe tip 118. In one embodiment, the LLP 500 may have an additional actuator (not shown) that allows the operator to switch between acquiring data from the LLP 500 and from the probe tip 118.

The projector 508 and camera 510 are electrically coupled to a controller 512 disposed within the enclosure 502. The controller 512 may include one or more microprocessors, digital signal processors, memory, and other types of signal processing and/or conditioning circuits and/or storage circuits. Due to the relatively large data volume typically generated by the LLP 500 when line scanning an object, the controller 512 may be arranged within the handle portion 504. The controller 512 may be electrically coupled to the arm buses 218 via electrical connector 434. The LLP 500 may further include actuators 514, 516 which may be manually activated by the operator to initiate operation and data capture by the LLP 500.

If the LLP 500 is connected with a device such as the AACMM 100 as described hereinbefore, then some or all of the relatively large amount of signal processing required by the LLP 500 may be carried out by the electronic data processing system 210 within the AACMM 100. The signal processing required typically involves processing the raw point cloud data of the object captured by the digital imaging sensor of the camera 510 to determine the resulting image of the object through use of, e.g., triangulation techniques. In this case, some of the data processing may also be carried out by the controller 512 within the handle 504 of the LLP 500. In the alternative, if the LLP 500 is a standalone device, then all of the required signal processing may be carried out by the controller 512 and/or by additional signal processing components located within the handle 504 of the LLP 500.

The laser line probe ("LLP") 500 in accordance with the aforementioned embodiments of FIGS. 10-11 may be utilized in embodiments of the present invention involving LLPs in particular (and line scanners in general) having increased high dynamic range ("HDR") compared to existing LLPs. Similar to the LLP 500 of FIGS. 10-11, the LLP 500 in accordance with these increased HDR embodiments of the present invention may include a projector 508 and a camera 510 and may be connected with an AACMM 100 or similar device. In the alternative, the LLP 500 may be a standalone, hand-held type of device.

An issue for all LLPs 500 is obtaining proper exposure control within each image frame (i.e., each imaged stripe) on relatively high contrast objects (i.e., an object containing both light and dark areas). Similarly, this issue also occurs with the imaging of a scene having both light and dark areas and/or objects within the scene. This is so as to create a relatively accurate image of the object or the scene. In other words, to obtain relatively accurate 3D coordinates with the LLP, it is desirable to accurately image both the light and dark areas of the object, along with the mid-range contrast areas of the object in between, on the photosensitive array of the camera 510.

Typically, in cameras 510, it is difficult to simultaneously obtain good images of dark, mid-range, and light contrast areas of the object or environment. This is due primarily to the limited dynamic range of the imaging device (e.g., a camera 510 such as a CMOS or CCD device having a 2D photosensitive array of light sensing elements—a.k.a., a digital imaging sensor). For example, a CMOS photosensitive array may be used having 2048×1024 light sensing elements and operating at 340 frames ("stripes") per second. The CMOS array generates, for each light sensing element of the array, a digital value that is approximately proportional to the illumination level striking each light sensing element. Most LLPs 500 commercially available today are configured to do a relatively good job in capturing the mid-range contrast areas of an object, but do a relatively poor job in capturing the relatively light and/or dark areas of an object (for "high contrast" objects that have such areas). That is, these LLPs have relatively limited or poor overall dynamic range.

Certain embodiments of the present invention include a system or apparatus for, and a method of, creating a relatively high dynamic range image using a rolling shutter approach with a camera 510 in which the exposure time of the camera 510 can be set on a row-by-row or column-by-column basis, thereby varying the exposure of the camera 510 instead of varying the power level of the laser light source within the projector 508. Other embodiments of the present invention disclosed herein differ somewhat from these embodiments, yet they retain the object of improving or increasing the dynamic range of the LLP 500.

Most of the CCD type of digital imaging sensors within a camera use a "global shutter" approach in which the entire photosensitive array within the camera is exposed for the a period of time (e.g., a window of time to capture the entire "frame" or "stripe" of an LLP 500 or laser line scanner). A global shutter may be electronic or mechanical, but an electronic global shutter is more common in CCDs used with devices such as LLPs that capture multiple frames per second. The global shutter approach is carried out in conjunction with timing instructions indicating when the entire sensor array is to start and stop gathering light energy. The CCD array converts the captured or sensed light energy into an electrical signal that it sends to an electrical circuit. An analog-to-digital converter on the electrical circuit provides digital values for each photodetector on the CCD array. These digital values are sent to a processor that carries out such further processing as may be required.

In contrast, while some CMOS digital imaging sensors within a camera use the global shutter approach, the majority of such CMOS digital imaging sensors use the "rolling shutter" approach. Basically, the rolling shutter approach of image acquisition involves scanning across the frame in sections either vertically or horizontally. That is, the CMOS pixels that capture the entire image are not scanned simultaneously as in the global shutter approach. Instead only portions or sections (e.g., rows, columns) of the frame are scanned, the scanning accomplished by rolling or moving the shutter across the pixels of the CMOS array, thereby causing only the portion or section of the object to be imaged at an instant in time. This can be carried out using a mechanical shutter (e.g., such as in video camcorders). However, most often the rolling shutter approach is carried out electronically using timing instructions to dictate when certain portions of the camera array are to be exposed to the light energy coming from the object or scene being imaged. Typically, the digital imaging sensor is turned on sequentially either vertically or horizontally one predetermined section or portion (e.g., a row) at a time and the data from the turned-on section is read out. This results in the entire array being panned or rolled either downward or sideways during one frame capture. The rolling shutter approach is also preferred when imaging a moving object.

CCD and CMOS types of sensors have other fundamental differences. Each type of sensor has some fundamental or inherent drawbacks unique to sensors of that type. CCD sensors operating in the typical global shutter manner suffer from a blurring or smearing of the image. This blurring occurs when the CCD sensor attempts to image a moving object. The amount of smearing depends on the shutter speed: smearing or blurring only occurs if the closing of the shutter, which occurs once per frame, is slow enough to enable the CCD to sense movement of the imaged object. Smearing can be avoided by making the rate of shutter closure fast enough to image a relatively rapidly moving object in a single frame.

On the other hand, the CMOS type of imaging sensor generally suffers from skew, wobble and partial exposure. Skew occurs when the resulting image bends diagonally in one direction or another as the camera or object moves. Wobble is related to skew, and partial exposure occurs when the camera array is used with a flash and the flash does not uniformly light up the array. These rolling shutter artifacts that occur with CMOS sensor arrays are mitigated somewhat when a faster rolling shutter speed is used during the imaging process.

Embodiments of the present invention are advantageous in that they provide for a rolling shutter approach to imaging an object by a digital imaging array sensor within an LLP 500. The array is typically of the CMOS type. Generally, use of a rolling shutter approach with LLPs in which the exposure time of the photosensitive array was varied either row-by-row or column-by-column was not possible because the time to set the exposure for each row or column was too long. That is, typically it was not possible to process the sensed data from one row in the array and then change the exposure for the next row when it was time to read the next row in the array. As a result, most commercially-available LLPs vary the power of the laser light source within the projector 508 of the LLP 500 instead of varying the exposure time of a camera 510 through the use of a rolling shutter. Commercially available LLPs 500 that vary the exposure time of the array typically do so using the aforementioned "global shutter" approach (i.e., on a frame-by-frame basis).

However, embodiments of the present invention provide for a rolling shutter approach to be used with the photosensitive array that comprises a digital imaging sensor of an LLP 500 or other type of line scanner. The rolling shutter approach utilized may be on a row-by-row basis or a column-by-column basis. Instead of turning on and reading out the sections or portions of the array in a sequential manner one row or column at a time from top to bottom in the array or from left to right in the array, embodiments of the present invention provide for a flexible, coded rolling shutter approach in which the rows or columns are turned on and read out not necessarily in a sequential manner. More specifically, in this coded approach the exposure times for each row or column in the array are not necessarily fixed (i.e., are not necessarily the same amount of time throughout the exposure process of the array), and the readout times are not necessarily linearly shifted throughout the array (i.e., from one row to the next or from one column to the next), as in traditional rolling shutter approaches. In embodiments, the rows may be read out in a sequential manner, but just not in a linear shifted manner. The traditional method of linear shifting involves reading out a portion of one row, then reading out a portion of the next row in the sequence, wherein the next row is shifted slightly a certain amount with respect to the previous row. This pattern of linear shifting is repeated throughout the array.

The rolling shutter approach of embodiments of the present invention is flexible in the sense that both the readout timing and exposure length can be controlled to provide for relatively improved sampling of the object or scene being imaged. In other words, this leads to a flexible time-space sampling method and apparatus. The resulting coded images of the object lead to various benefits, including improved or increased dynamic range of the digital imaging device of the camera 510, and thus, a HDR LLP 500.

Figure 12:
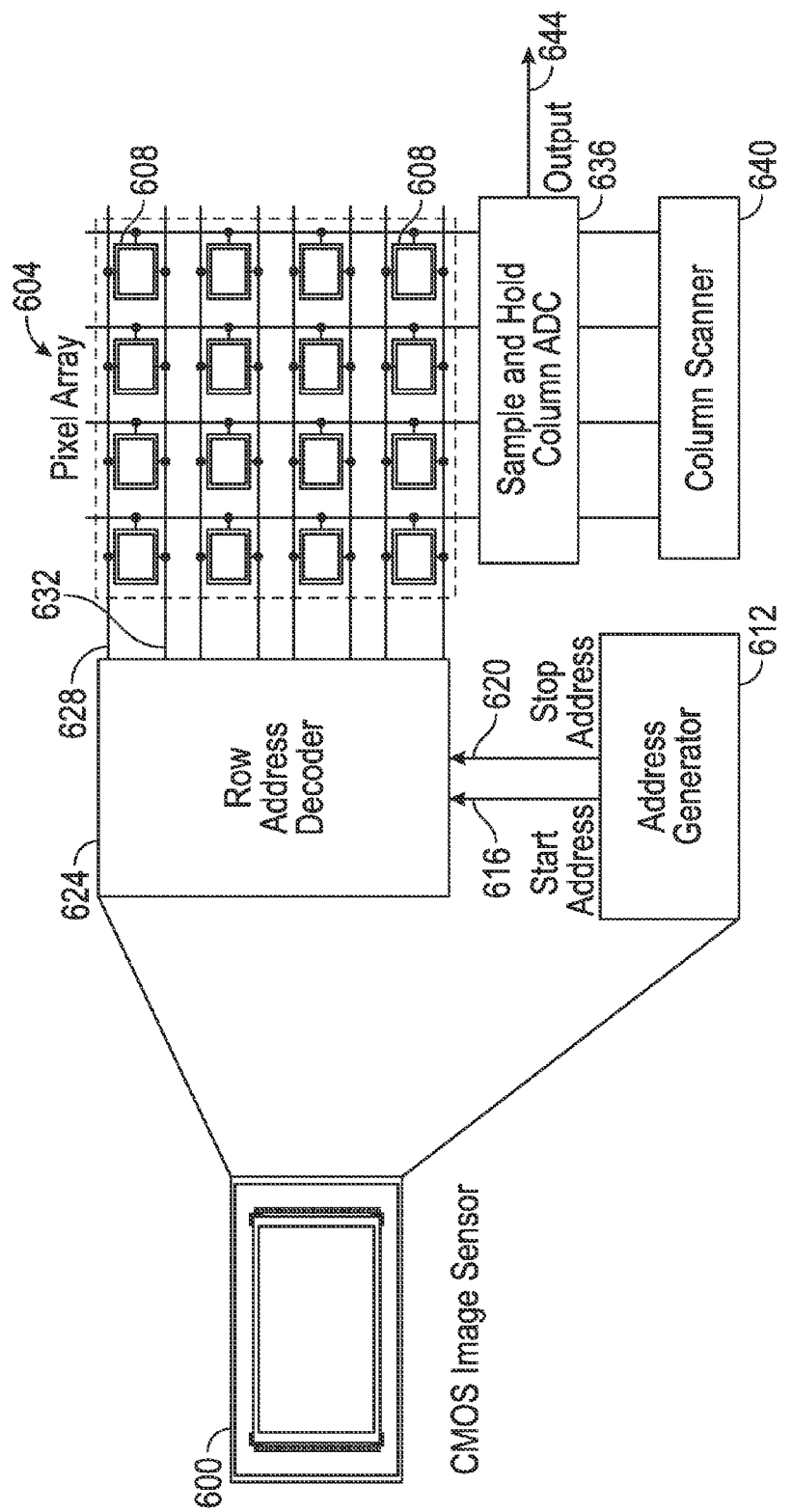
FIG. 12 is a block diagram of a CMOS image sensor of the prior art showing the array of light sensors and the associated electronics for controlling the exposure of the array elements to light energy and for reading out the captured light energy therefrom.

Referring to FIG. 12, there illustrated is a known CMOS digital imaging sensor 600 of the prior art. The sensor includes a photosensitive array 604 comprising a plurality of pixels or light sensors 608 (e.g., photodiodes), typically arranged in a grid such as a square. While only 16 light sensors 608 are shown in the array 604 of FIG. 12 for simplicity, a commercially-available digital imaging sensor 600 typically contains thousands or millions of light sensors 608 in an array 604. As mentioned hereinabove, a modern CMOS photosensitive array 604 may contain 2048×1024 light sensing elements 608 and may operate at 340 frames per second.

The sensor 600 of FIG. 12 includes an address generator 612, which is usually a shift register that provides the starting address signals and ending or stop address signals on lines 616, 620, respectively, to a row address decoder 624. The address generator 612 and row address decoder 624 together generate and send to each row of light sensors 608 in the array 604 a pair of signals. Each of the rows receives the pair of signals 628, 632 on a pair of lines attached to each of the light sensors of each row. The signals 628, 632 comprise row reset and row select signals, respectively. Each row of light sensors 608 in the array 604 becomes photosensitive and collects light energy (i.e., photons) after activation of a corresponding row reset signal 628. Conversely, each row of light sensors 608 in the array 604 stops collecting photons and starts reading out data after activation of a row select signal 632. The data is typically read out through a sample and hold column analog-to-digital converter ("ADC") 636 that is controlled by a column scanner 640. The digital output on a line 644 typically comprises eight binary bits, and is provided to some type of data processor or controller 512 in FIG. 11 for further processing, for example, to compute the resulting 3D coordinates of points on the surface of the object being scanned by the LLP 500.

Figure 13:
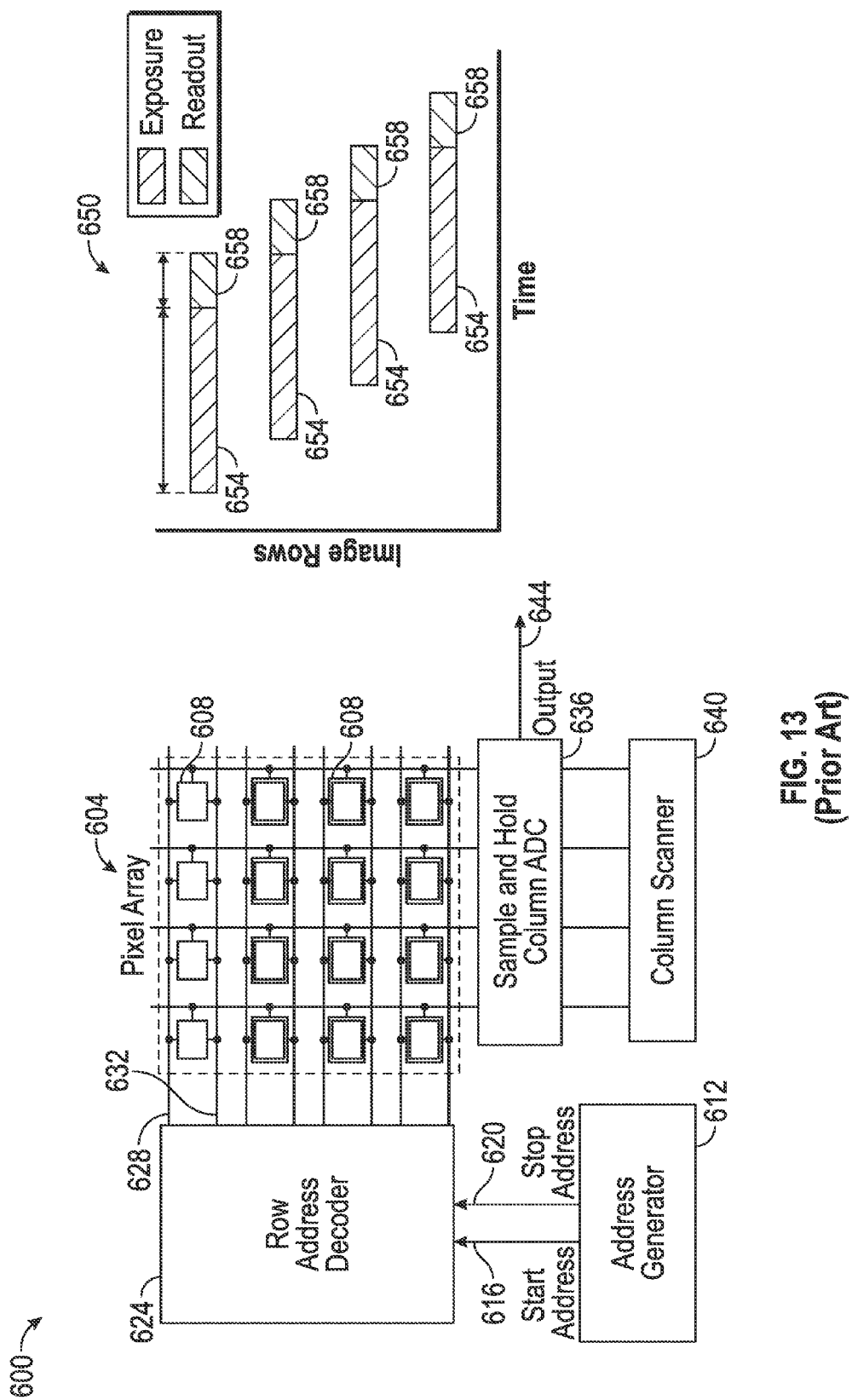
FIG. 13 is a block diagram of the CMOS image sensor of the prior art of FIG. 12 along with a graph showing the exposure times and readout times of the various array light sensors.

FIG. 13 illustrates the CMOS digital imaging sensor 600 of FIG. 12 with a graph 650 showing a typical row-by-row rolling shutter approach in the prior art. In this approach, the exposure times 654 for successive rows in the array 604 are linearly shifted in a sequential manner from top to bottom in the graph 650. That is, the rows are sequentially addressed from top to bottom in the array 604. Each exposure time 654 is the same or fixed and is followed by a readout time 658. Since typically the digital imaging sensor 600 contains only one row of readout circuits, with the readout values provided on output line 644, the readout timings 658 for different rows cannot overlap, as shown in FIG. 13. In this known rolling shutter approach, the readout timings 658 are linearly shifted sequentially from top to bottom, as illustrated in FIG. 13.

Figure 14:
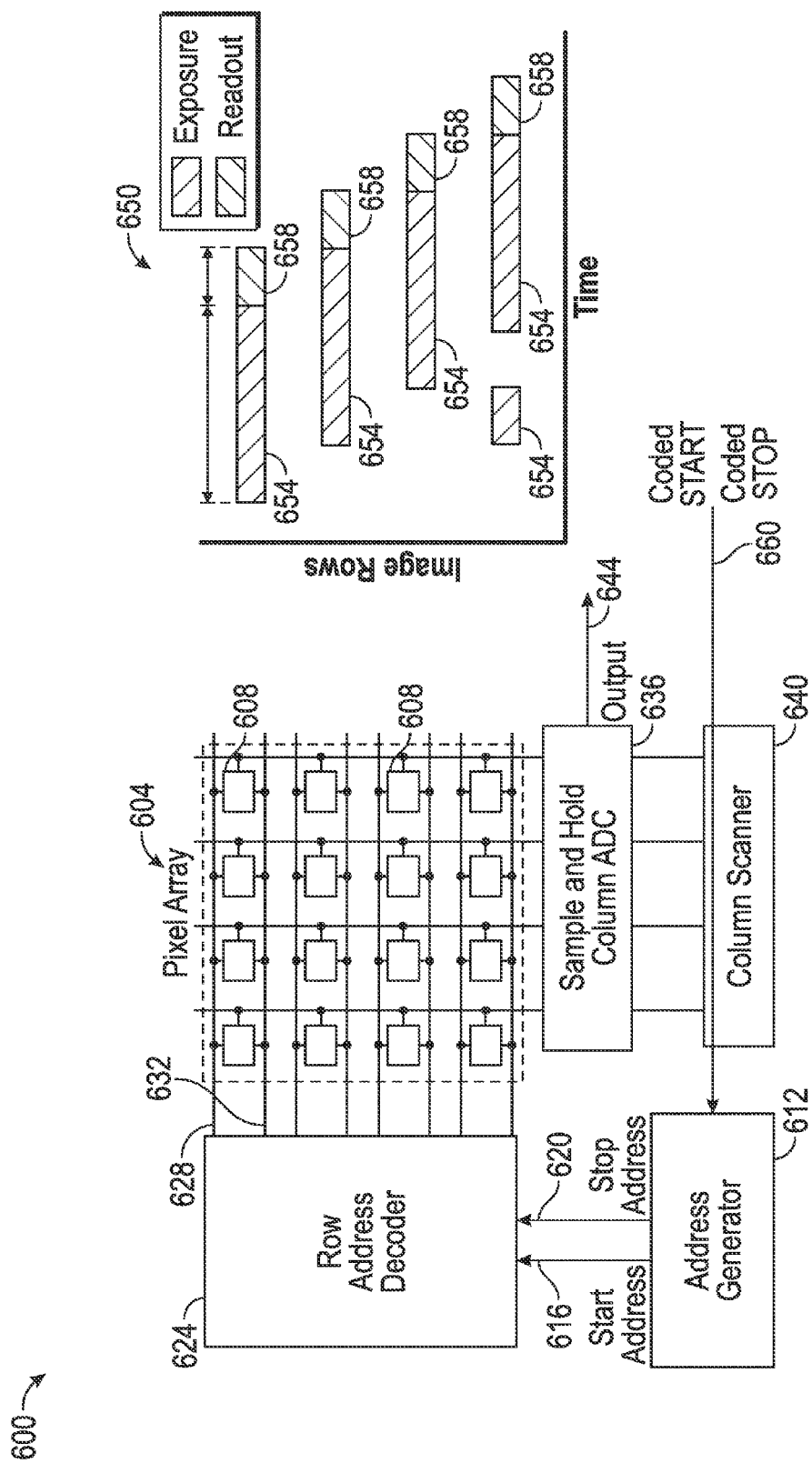
FIG. 14 is a block diagram of a CMOS image sensor of embodiments of the present invention showing the array of light sensors and the associated electronics for controlling the exposure of the array elements to light energy and for reading out the captured light energy therefrom, including coded start and stop signals for implementing a flexible approach to exposure of the array elements to light energy reflected from the object being imaged.

Referring now to FIG. 14, there illustrated is an embodiment of the present invention in which the address generator 612 is modified by coded start and stop signals on a line 660 from a processor or controller 512 such that the exposure time 654 and the readout time 658 for each row in the array 604 can be controlled. The constraint that the readout times 658 between rows cannot change overall still exists. The coded start and stop signals 660 control the generation of the row reset and row select signals 628, 632, respectively, by the row address decoder 624. The signals 628, 632 are provided to each row of photosensitive elements or light sensors 608 within the array 604. More specifically, the coded start and stop signals 660 can be flexibly generated such that flexible time—space sampling of the object by the digital imaging device within the camera 510 can be implemented. This makes it possible to eliminate the constraint to a sequential pattern of row exposures and readouts, as in the prior art of FIGS. 12 and 13.

Figure 15:
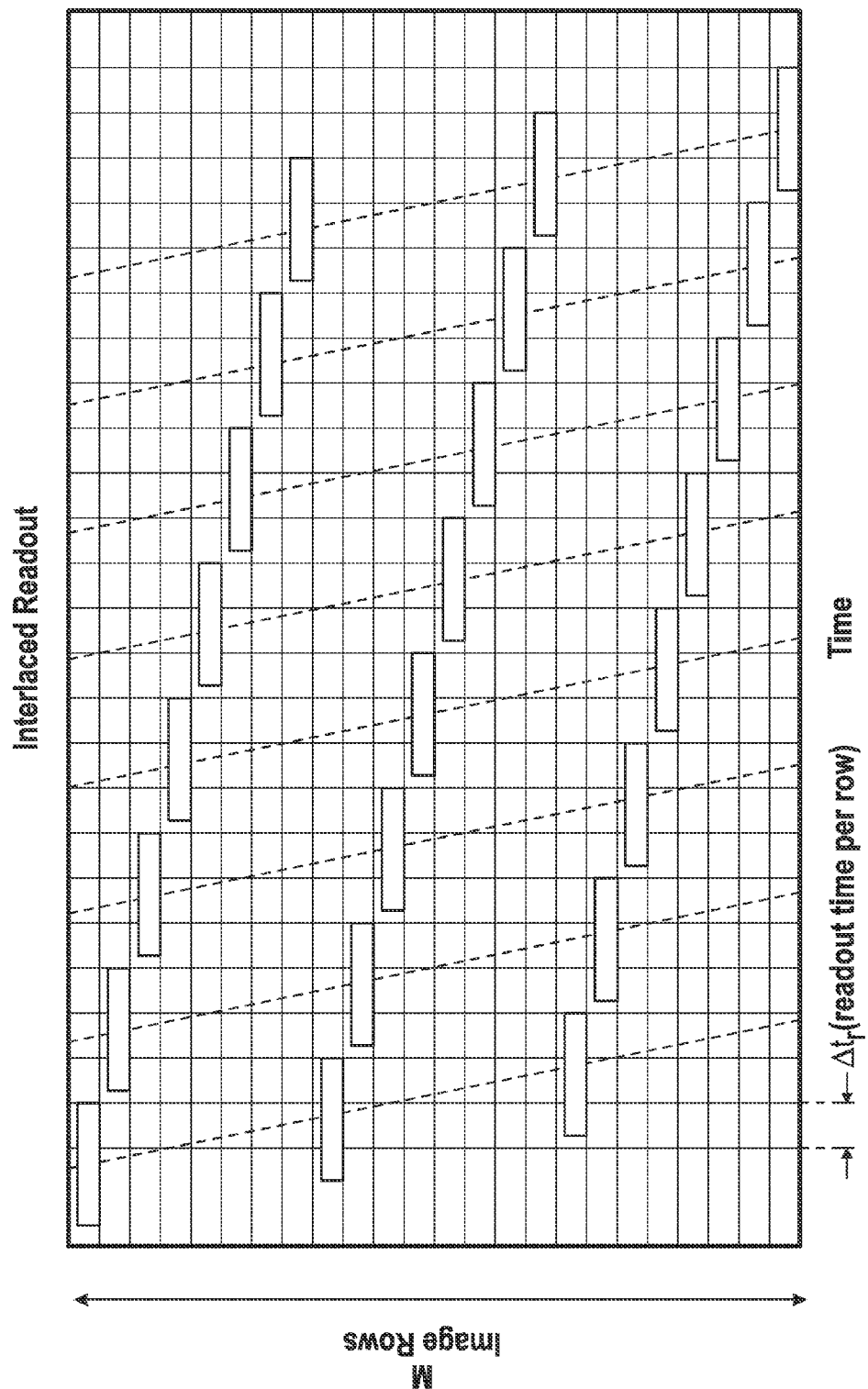
FIG. 15 is a graph of one type of a coded interlaced readout approach according to embodiments of the present invention for reading out the contents of the light sensors within the array.

One example of a coded readout scheme for an LLP 500 according to embodiments of the present invention is shown in FIG. 15 and comprises an interlaced coded readout scheme. This type of coded readout scheme allows for relatively improved sampling of the time dimension by shuffling the readout timing among the rows in the array 604. This is similar to interlacing in video broadcast systems. This type of coded interlaced readout uses all the rows and allows for full length exposure for each row.

Figure 16:
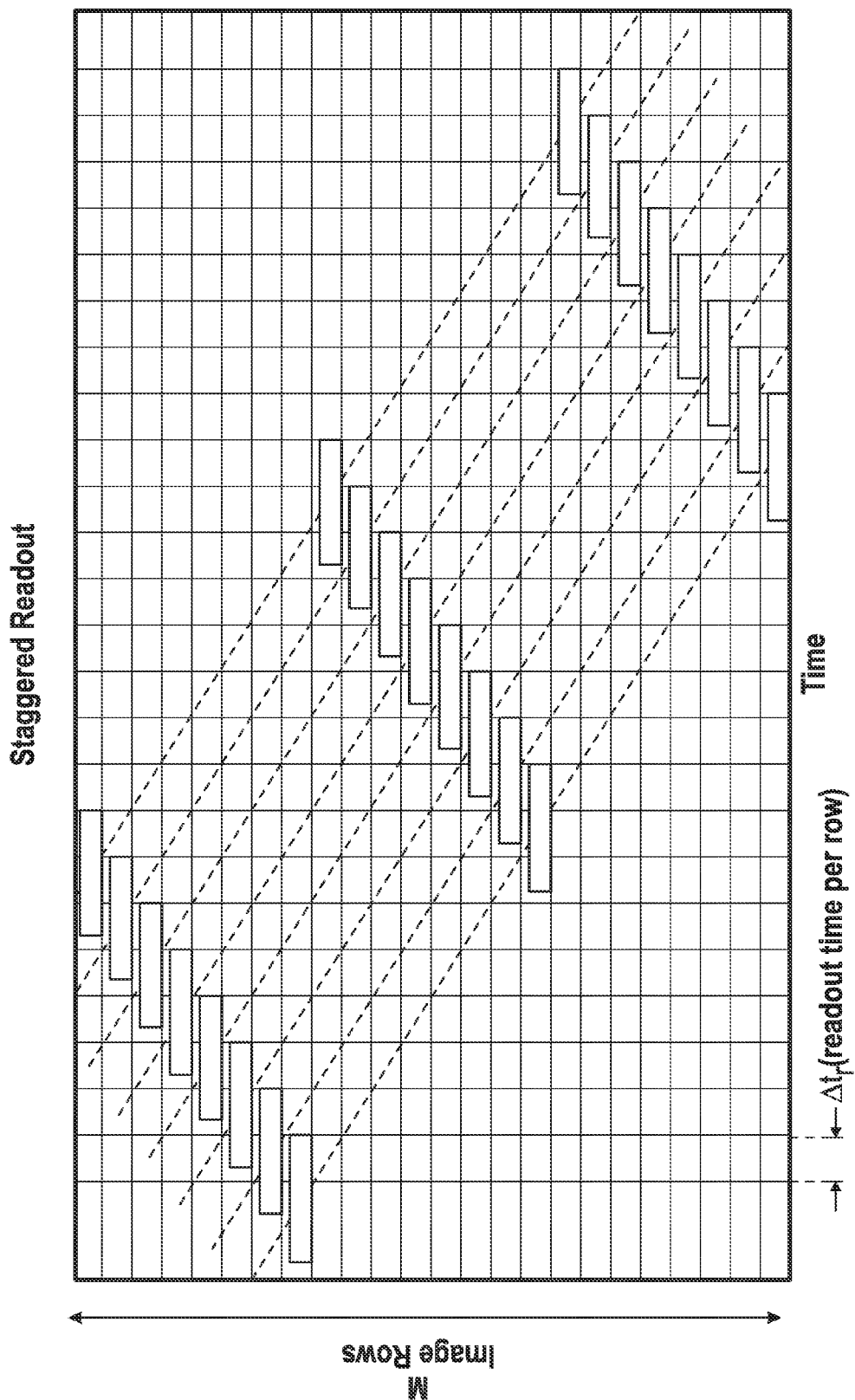
FIG. 16 is a graph of another type of a coded staggered readout approach according to embodiments of the present invention for reading out the contents of the light sensors within the array.

Another example of a coded readout scheme for an LLP 500 according to embodiments of the present invention is shown in FIG. 16 and comprises a staggered readout. In this coded readout scheme, the order of the readout is reversed within every certain number of rows.

Figure 17:
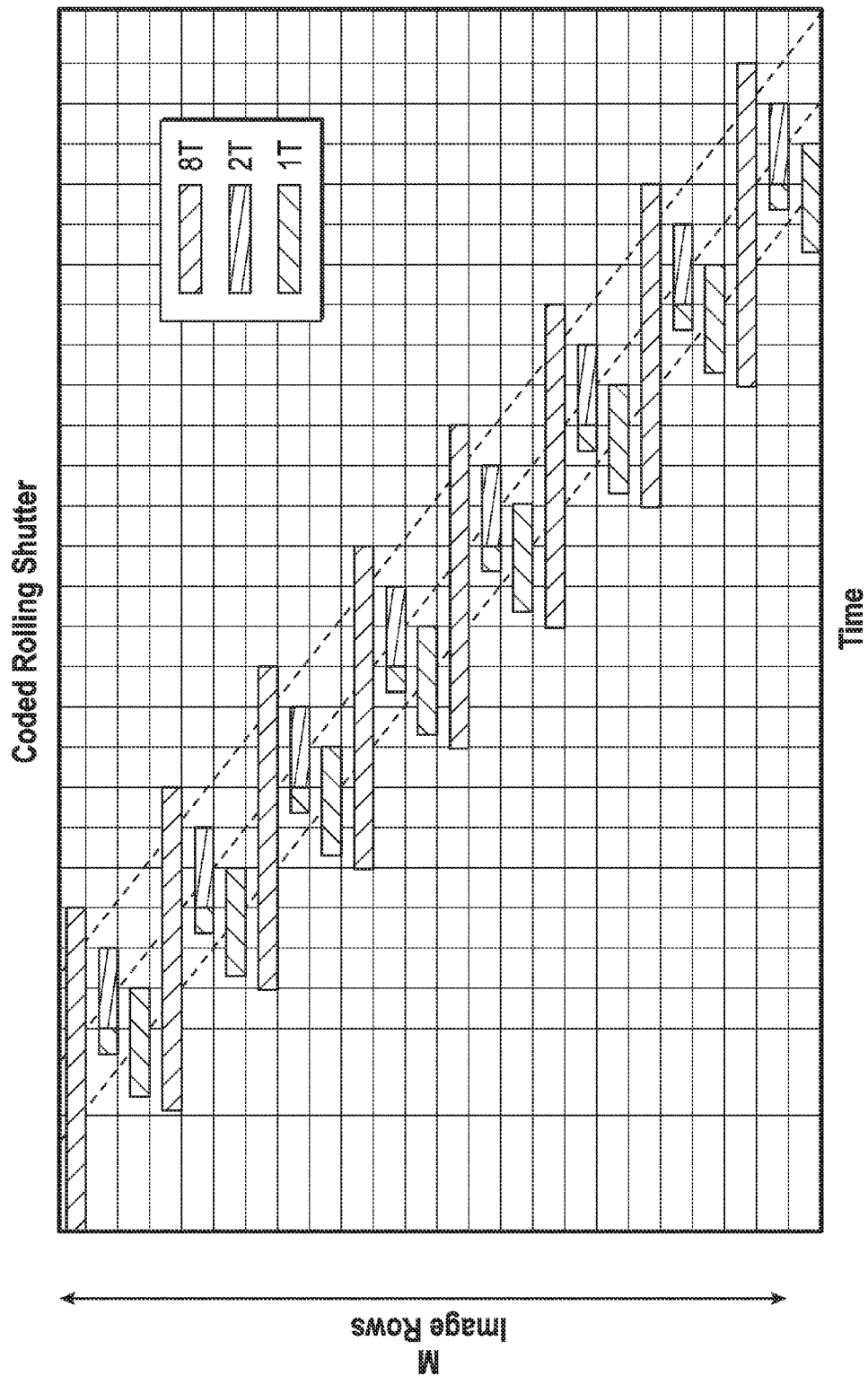
FIG. 17 is a graph of one type of a coded exposure approach according to embodiments of the present invention for exposing the individual light sensors within the array to light reflected from the object being imaged and using three different lengths of time for the exposure times.

FIG. 17 illustrates yet another approach to coded exposure and readout which has the benefit of increasing the dynamic range of the array 604, and, thus, the LLP 500. In the embodiment of FIG. 17, three different exposure times are given in a ratio format: 1T, 2T and 8T, where 2T is twice the amount of exposure time as 1T, and where 8T is eight times the amount of exposure time as 1T. However, these time ratios are purely exemplary. Other time ratios may be used. Nevertheless, in this embodiment multiple exposures can be coded into a single image from which three sub-images may be extracted. These sub-images may be directly used to compose an HDR image of the object or scene being imaged.

More details about the coded rolling shutter approach of embodiments of the present invention are given in "Coded Rolling Shutter Photography: Flexible Space-Time Sampling," J. Gu, Y. Hitomi, T. Mitsunaga and S. K. Nayar, IEEE International Conference on Computational Photography (ICCP), March 2010, which is incorporated by reference herein.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A line scanner for measuring three-dimensional coordinates of a surface of an object, comprising:

a projector including a light source and a projector lens, the projector configured to project light from the light source through the lens as a line of light at the surface of the object;

a camera including a photosensitive array and a camera lens, the photosensitive array including a two-dimensional array of light sensors, the array of light sensors having M rows and N columns, where M and N are integers, the camera further including control electronics configured to control exposure time of each light sensor in the array of light sensors and to control readout time of each light sensor in the array of light sensors, the exposure time of each light sensor in the array of light sensors being controlled in one of the rows and the columns of the light sensors, the readout time of each light sensor in the array of light sensors being controlled in the one of the rows and the columns, the exposure time of each light sensor in the array of light sensors being controlled such that the array of light sensors is controlled in a non-sequential manner, each of the light sensors in the array of light sensors configured to convert an amount of optical energy captured by each of the light sensors into a digital signal value, the optical energy captured by the light sensors being from a reflected line of light from the surface of the object, the reflected line of light being the projected line of light reflected from the surface of the object, the exposure time of each of the light sensors in a first row starts with a first row reset signal and ends with a first row select signal, the first exposure time is a first time period between the first row reset signal and the first row select signal, and the readout time of the first row starts with the first row select signal; and a processor configured to receive the digital signal values and to calculate two of the three-dimensional coordinates of the surface of the object therefrom.

2. The line scanner of claim 1, wherein the projector is fixed with respect to the camera and both are enclosed in a housing.

3. The line scanner of claim 1, wherein the exposure time of each of the light sensors in a second row starts with a second row reset signal and ends with a second row select signal, wherein the second exposure time is a second time period between the second row reset signal and the second row select signal, and wherein the readout time of the second row starts with the second row select signal.

4. The line scanner of claim 3, wherein the exposure time of each of the light sensors in a third row starts with a third row reset signal and ends with a third row select signal, wherein the third exposure time is a third time period between the third row reset signal and the third row select signal, and wherein the readout time of the third row starts with the third row select signal.

5. The line scanner of claim 4, wherein the second row is between the first row and the third row in the two-dimensional array of light sensors, wherein the second exposure time is different than the first exposure time, and wherein the readout times are in a sequential order of the first readout time, the third readout time, and the second readout time.

\* \* \* \* \*